(12) United States Patent
Kamiyama et al.

(10) Patent No.: US 9,802,151 B2
(45) Date of Patent: Oct. 31, 2017

(54) AIR POLLUTION CONTROL SYSTEM AND AIR POLLUTION CONTROL METHOD

(71) Applicant: MITSUBISHI HITACHI POWER SYSTEMS, LTD., Yokohama-shi, Kanagawa (JP)

(72) Inventors: Naoyuki Kamiyama, Tokyo (JP); Seiji Kagawa, Tokyo (JP); Toshihiro Fukuda, Kanagawa (JP); Tetsu Ushiku, Kanagawa (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 0 days.

(21) Appl. No.: 15/119,545

(22) PCT Filed: Jan. 26, 2015

(86) PCT No.: PCT/JP2015/052007
§ 371 (c)(1),
(2) Date: Aug. 17, 2016

(87) PCT Pub. No.: WO2015/125559
PCT Pub. Date: Aug. 27, 2015

(65) Prior Publication Data
US 2017/0050144 A1    Feb. 23, 2017

(30) Foreign Application Priority Data
Feb. 24, 2014  (JP) ................. 2014-033353

(51) Int. Cl.
*B01D 53/50*  (2006.01)
*B01D 53/80*  (2006.01)
(Continued)

(52) U.S. Cl.
CPC ....... *B01D 53/501* (2013.01); *B01D 53/1481* (2013.01); *B01D 53/1493* (2013.01);
(Continued)

(58) Field of Classification Search
CPC ........... B01D 53/501; B01D 2251/404; B01D 2251/606; B01D 53/346; B01D 53/1481;
(Continued)

(56) References Cited

U.S. PATENT DOCUMENTS 5,678,493 A * 10/1997 Kelley ............... B03C 3/013
110/185
8,734,747 B2 * 5/2014 Sugita ............... F23J 15/02
422/105
(Continued)

FOREIGN PATENT DOCUMENTS

CA    2541973 C  *  8/2011  ........... B01D 53/10
JP    3-123623 A    5/1991
(Continued)

OTHER PUBLICATIONS

International Search Report dated Apr. 28, 2015, issued in counterpart International Application No. PCT/JP2015/052007 (2 pages).
(Continued)

*Primary Examiner* — Timothy Vanoy
(74) *Attorney, Agent, or Firm* — Westerman, Hattori, Daniels & Adrian, LLP

(57) ABSTRACT

The air pollution control system including: a flue gas duct through which flue gas flows; a heat exchanger provided to the flue gas duct; a limestone supply device for reducing $SO_3$ in the flue gas supplies $CaCO_3$ to the flue gas flowing in an upstream of the heat exchanger; an upstream $SO_3$ measurement device measures the $SO_3$ in the flue gas flowing in a stream upper than a position where the limestone supply device supplies the $CaCO_3$; and a control device determines a quantity supplied of the $CaCO_3$ based on a relationship between a quantity of the $SO_3$ measured by the upstream $SO_3$ measurement device and a molar ratio of $SO_3$ to $CaCO_3$ (Continued)

and which supplies the determined quantity supplied of the CaCO$_3$ from the limestone supply device to the flue gas duct.

10 Claims, 13 Drawing Sheets

(51) Int. Cl.
*B01D 53/74* (2006.01)
*B01D 53/75* (2006.01)
*B01D 53/81* (2006.01)
*F23J 15/02* (2006.01)
*F23J 15/06* (2006.01)
*B01D 53/14* (2006.01)
*B01D 53/34* (2006.01)

(52) U.S. Cl.
CPC ........... *B01D 53/346* (2013.01); *B01D 53/80* (2013.01); *F23J 15/02* (2013.01); *F23J 15/06* (2013.01); *B01D 2251/404* (2013.01); *B01D 2251/606* (2013.01); *B01D 2252/10* (2013.01); *B01D 2257/302* (2013.01); *F23J 2215/20* (2013.01); *F23J 2219/40* (2013.01); *F23J 2219/50* (2013.01); *F23J 2219/60* (2013.01); *Y02E 20/363* (2013.01)

(58) Field of Classification Search
CPC ............... B01D 2252/10; B01D 53/80; B01D 2257/302; B01D 53/74; B01D 53/75; B01D 53/81; F23J 15/02; F23J 15/06; F23J 2215/20; F23J 2219/40; F23J 2219/50; F23J 2219/60
See application file for complete search history.

(56) References Cited

U.S. PATENT DOCUMENTS

| | | | |
|---|---|---|---|
| 2010/0071348 A1 | 3/2010 | Kobayashi et al. | |
| 2014/0075920 A1* | 3/2014 | Sugita | F23J 15/02 60/274 |
| 2017/0050144 A1* | 2/2017 | Kamiyama | B01D 53/501 |

FOREIGN PATENT DOCUMENTS

| | | |
|---|---|---|
| JP | 4-300624 A | 10/1992 |
| JP | 8-257349 A | 10/1996 |
| JP | 10-118446 A | 5/1998 |
| JP | 11-57395 A | 3/1999 |
| JP | 11-165030 A | 6/1999 |
| JP | 2003-126649 A | 5/2003 |
| JP | 2007-245074 A | 9/2007 |
| WO | 2008/078721 A1 | 7/2008 |

OTHER PUBLICATIONS

Written Opinion dated Apr. 28, 2015, issued in counterpart International Application No. PCT/JP2015/052007 (5 pages).
Translation of Written Opinion dated Apr. 28, 2015, issued in counterpart International Application No. PCT/JP2015/052007 (7 pages).

* cited by examiner

AIR POLLUTION CONTROL SYSTEM AND AIR POLLUTION CONTROL METHOD

FIELD

The present invention relates to an air pollution control system which supplies limestone to flue gas emitted from a combustion engine and treats sulfur oxides and relates to an air pollution control method.

BACKGROUND

Most of sulfur oxides ($SO_x$) contained in flue gas emitted from a boiler of a power plant and the like are sulfur dioxide ($SO_2$), but some of them are converted to sulfur trioxide ($SO_3$) due to catalytic function of metal-oxides carried on denitrification catalyst or coexisting incinerated ashes. Due to high reactivity and corrosivity of $SO_3$, neutralization thereof has been generally carried out in the related art. Such neutralization is carried out by injecting ammonia to a flue gas duct so as to prevent deterioration of equipment. When combusted in a boiler, sulfur (S) content derived from fuel of a thermal power plant is oxidized by catalyst components in the fuel or catalysts of a denitrification device and is converted from sulfur dioxide ($SO_2$) to sulfur trioxide ($SO_3$). Concentration of this converted $SO_3$ sometimes reaches about 30 to 50 ppm at a maximum in the flue gas of a coal combustion boiler. In oil combustion-heavy fuel, the concentration of this converted $SO_3$ sometimes reaches about 180 ppm at a maximum, though it depends on a condition of contamination in the boiler or a condition of combustion. $SO_3$ in the flue gas may cause problems such as a corrosion of equipment or a clogging due to increased ash-adhesiveness and the like, in cryogenic equipment which is in a downstream of an air heater. Such a problem may lead to increasing maintenance costs of a power plant user. Furthermore, $SO_3$ is known as a typical component that causes blue smoke from a stack. In a case of thick blue smoke, there may be no choice but to stop the plant.

Therefore, examples of a method for removing this $SO_3$ in the related art include the following proposals. That is, spraying $CaCO_3$, $Ca(OH)_2$, $CaO$, and the like to the flue gas duct in addition to introducing ammonia thereto, and spraying Active Carbon (AC; a porous impurity-absorbent containing carbon as a principal component) to remove $SO_x$ (see Patent Literatures 1 and 2).

Furthermore, Patent Literature 3 discloses an air pollution control system including a denitrification device, an air heater, a heat-recovery unit, a precipitator, and a desulfurization device. Herein, the denitrification device removes nitrogen oxides of flue gas from a boiler. The air heater recovers heat of the flue gas which has passed through the denitrification device. The heat-recovery unit recovers the heat of the flue gas and is used for raising a temperature of the flue gas emitted from a stack. The precipitator removes dust in the flue gas after the heat recovery. The desulfurization device removes sulfur oxides in the flue gas after the dust removal. With regard to the precipitator, a system provided before the heat-recovery unit may also be used. A typical example of the desulfurization device includes a wet-type desulfurization device which removes the sulfur oxides in the flue gas by bringing the flue gas into gas-liquid contact with an absorbent and the like containing slurry in which limestone (calcium carbonate, $CaCO_3$) and other components are suspended. The device disclosed in Patent Literature 3 includes a means for controlling a quantity of a solid particle to be supplied to a charge-adsorption means based on detected values of concentration of $SO_3$ in a flue gas outlet of the desulfurization device.

CITATION LIST

Patent Literatures

Patent Literature 1: Japanese Laid-open Patent Publication No. 4-300624
Patent Literature 2: Japanese Laid-open Patent Publication No. 10-118446
Patent Literature 3: Japanese Laid-open Patent Publication No. 2007-245074

SUMMARY

Technical Problem

When mainly removing $SO_3$ among sulfur oxides contained in flue gas, some air pollution control systems supply a part of powdered limestone, mainly used in a desulfurization device to remove $SO_3$ among sulfur oxides contained in flue gas, from an upstream of a heat exchanger such as an air heater, heat-recovery unit, and the like. Supplying limestone to the upstream of the air heater or the upstream of the heat-recovery unit leads to removing $SO_3$ which condenses when the flue gas is cooled in the air heater or the heat-recovery unit. Such removal of $SO_3$ is achieved by a physical absorption reaction or a chemical alkali reaction or the like due to the powdered limestone. As a result, it is possible to restrain operation impediment such as a clogging due to attachment of ashes with high adhesiveness inside the devices.

Herein, the limestone supplied to the flue gas can be collected in a precipitator or the desulfurization device which are in a downstream. However, the more a quantity of $SO_3$ which should be removed increases, the more a quantity of the limestone to be supplied to the upstream of a heat exchanger increases. The more the quantity of the limestone to be supplied increases, the more capacities of the precipitator or the desulfurization device in the downstream increases. Furthermore, excessive quantity supplied of the limestone leads to increasing a quantity of limestone which is not used for removing sulfur oxides. Furthermore, few quantities supplied of the limestone leads to increasing adhesiveness of ashes ascribable to sulfur oxides. Therefore, the ashes easily adhere to an inside of equipment such as the heat exchanger, a flue gas duct, the precipitator, and the like.

The present invention has been made in the light of the aforementioned problems. An object of the present invention is to provide an air pollution control system which can efficiently reduce sulfur oxides contained in flue gas and efficiently use limestone and to provide an air pollution control method.

Solution to Problem

In order to achieve the above object, according to an aspect of the present invention, there is provided an air pollution control system including: a flue gas duct through which flue gas emitted from a combustion engine that combusts fuel flows; a heat exchanger disposed in the flue gas duct; a limestone supply device for reducing $SO_3$ in the flue gas which supplies $CaCO_3$ to the flue gas flowing in an upstream of the heat exchanger; an upstream $SO_3$ measurement device which measures the $SO_3$ in the flue gas flowing in a stream upper than a position where the limestone supply device for reducing the $SO_3$ in the flue gas supplies the $CaCO_3$; and a control device which determines a quantity supplied of the $CaCO_3$ based on a relationship between a quantity of the $SO_3$ measured by the upstream $SO_3$ measurement device and a molar ratio of $SO_3$ to $CaCO_3$ and which supplies to the flue gas duct the determined quantity supplied of the $CaCO_3$ from the limestone supply device for reducing the $SO_3$ in the flue gas.

It is preferable that the control device sets the molar ratio of $CaCO_3/SO_3$ to be 2.0 or more. The control device can set a target value of the $SO_3$ reduction rate up to 80% by setting the molar ratio of $CaCO_3/SO_3$ to be 2.0 or more.

It is preferable that toe control device sets a reference value of the molar ratio of $CaCO_3/SO_3$ and a $SO_3$ reduction characteristics curve so as to determine, as the quantity supplied of the $CaCO_3$, a quantity within an allowable range set from the reference value and the $SO_3$ reduction characteristics curve.

It is preferable that the air pollution control system includes a downstream $SO_3$ measurement device which measures $SO_3$ of the flue gas flowing in a stream downer than the heat exchanger. It is preferable that the control device performs a feedback control to correct the determined quantity supplied of the $CaCO_3$ based on a quantity of the $SO_3$ measured by the downstream $SO_3$ measurement device.

It is preferable that the air pollution control system includes a precipitator which is disposed in the stream lower than the heat exchanger and reduce dust in the flue gas after heat recovery.

It is preferable that the air pollution control system includes a circulation system which separates $CaCO_3$ contained in the dust reduced by the precipitator and supplies the separated $CaCO_3$ to the upstream of the heat exchanger. It is preferable that the control device determines the quantity supplied of the $CaCO_3$ as taking into account the $CaCO_3$ circulated in the circulation system.

It is preferable that air pollution control system includes a precipitator disposed in the stream upper than the heat exchanger and reducing dust in the flue gas; a desulfurization device disposed in the stream downer than the heat exchanger and reducing, with an absorbent, sulfur oxides contained in the flue gas from which the dust has been reduced and which has passed through the heat exchanger; and a limestone supply device for the desulfurization device supplying $CaCO_3$ to the desulfurization device. It is preferable that the control device determines the quantity of the $CaCO_3$ to be supplied from the limestone supply device for the desulfurization device to the desulfurization device in accordance with a quantity of the $CaCO_3$ to be supplied from the limestone supply device for reducing the $SO_3$ in the flue gas, and supplies the determined quantity of the $CaCO_3$ from the limestone supply device for the desulfurization device to the desulfurization device.

It is preferable that the combustion engine is a boiler, and the heat exchanger is a heat-recovery unit for recovering heat of the flue gas after the dust removal and for raising a temperature of the flue gas emitted from a stack. It is preferable that the air pollution control system further includes: a denitrification device which is disposed in the flue gas duct and which reduces nitrogen oxides from the flue gas emitted from the boiler; and an air heater which is disposed in a downstream of the denitrification device of the flue gas duct as well as in an upstream of the precipitator and which recovers the heat of the flue gas which has passed through the denitrification device.

It is preferable that the air pollution control system further includes a $SO_2$ measurement device which is disposed in at least either an upstream or a downstream of the desulfurization device and which measures $SO_2$ in the flue gas. It is preferable that the control device determines the quantity of the $CaCO_3$ to be supplied from the limestone supply device for the desulfurization device to the desulfurization device as taking into account a quantity of the $SO_2$ measured by the $SO_2$ measurement device.

It is preferable that the air pollution control system further includes a $CaCO_3$ measurement device which measures $CaCO_3$ in the absorbent. It is preferable that the control device determines the quantity of the $CaCO_3$ to be supplied from the limestone supply device for the desulfurization device to the desulfurization device as taking into account the quantity of the $CaCO_3$ measured by the $CaCO_3$ measurement device.

In order to achieve the above object, according to an aspect of the present invention, there is provided an air pollution control method by supplying $CaCO_3$ to an upstream of a heat exchanger in a air pollution control system including a flue gas duct through which the flue gas emitted from a combustion engine that combusts fuel flows and including the heat exchanger which is disposed in the flue gas duct. The method includes a step of measuring $SO_3$ in the flue gas flowing in a stream upper than a position where the $CaCO_3$ is supplied; a step of determining a quantity supplied of the $CaCO_3$ based on a relationship between the measured quantity of the $SO_3$ and a molar ratio of $SO_3$ to $CaCO_3$; and a step of supplying the determined quantity supplied of the $CaCO_3$ to the flue gas duct.

Advantageous Effects of Invention

According to the present invention, sulfur oxides in flue gas are reliably treated by a desulfurization device and ashes containing $SO_3$ inside a flue gas duct are reliably restrained from adhering to various kinds of equipment or the flue gas duct. Furthermore, it is possible to properly control a consumption amount of limestone to be supplied.

DESCRIPTION OF EMBODIMENTS

Preferable embodiments of the present invention will be hereinafter described in detail with reference to the accompanying drawings. Note that the present invention should not be restricted to the embodiments. Furthermore, in a case where a plurality of embodiments exists, the present invention may also include an embodiment that combines each of those embodiments.

Figure 1:
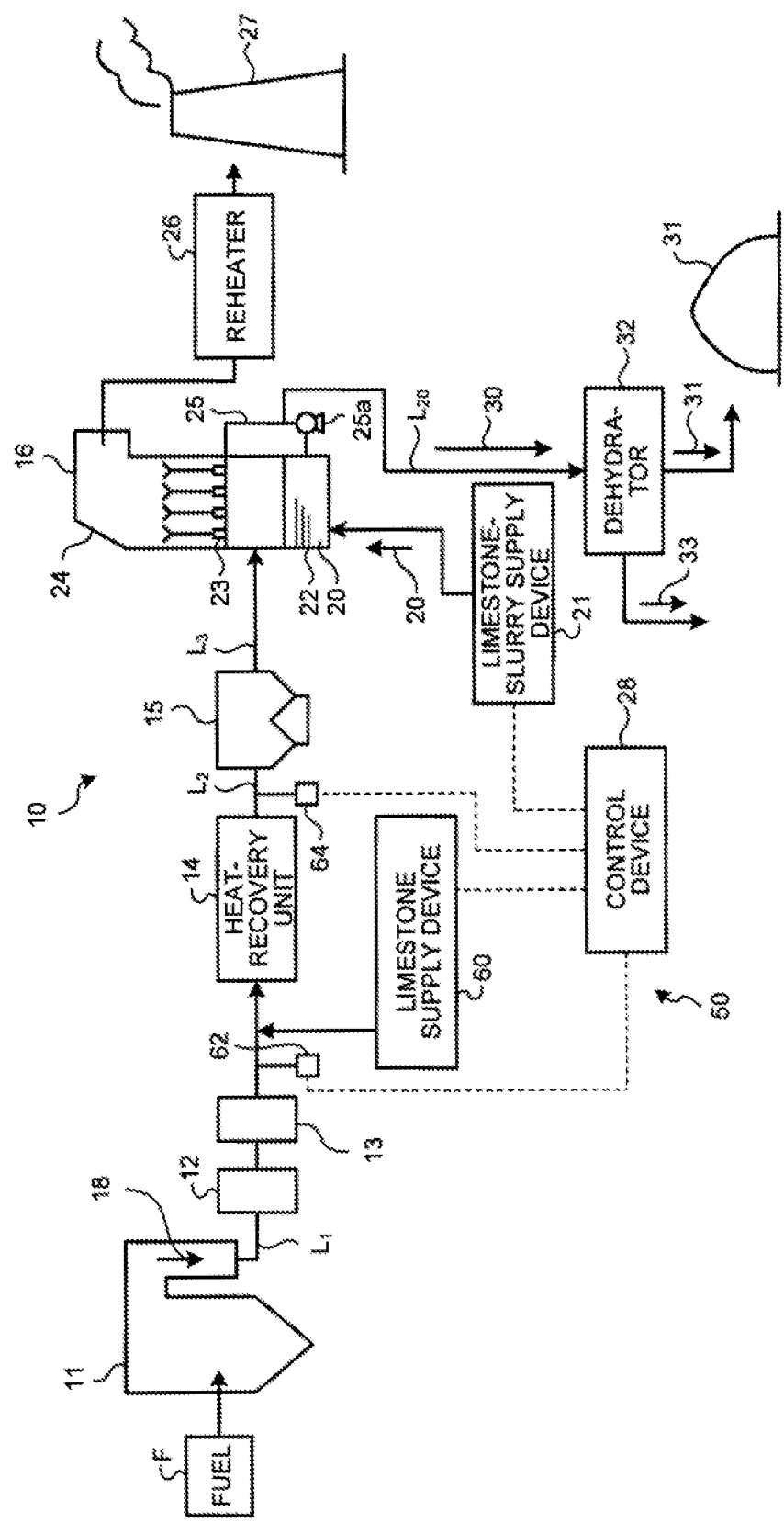
FIG. 1 is a schematic view of a configuration of an air pollution control system according to an embodiment of the present invention.

FIG. 1 is a schematic view of a configuration of an air pollution control system according to an embodiment of the present invention. An air pollution control system 10 exemplarily illustrated in FIG. 1 is a device which reduces noxious materials such as nitrogen oxides ($NO_x$), sulfur oxides ($SO_x$), and the like from, for example, boiler flue gas (hereinafter referred to as "flue gas") 18 emitted from a boiler 11. The boiler 11 is a coal combustion boiler using coal, residual solid materials, and the like for fuel, or an oil combustion boiler using heavy oil, residual oil, and the like for fuel, or the like. Note that the present embodiment uses the boiler as a combustion system for combusting the fuel, but it should not be restricted thereto. The boiler 11 can be taken place by various combustion engines which combust the fuel and emit the flue gas.

The air pollution control system 10 according to the embodiment includes the boiler 11, a denitrification device 12, an air heater 13, a heat-recovery unit 14, a precipitator 15, a desulfurization device 16, a reheater 26, a stack 27, a control device 28, a dehydrator 32, and a limestone supply system 50. The boiler 11 combusts fuel F. The denitrification device 12 removes and reduces the nitrogen oxides in the flue gas 18 from the boiler 11. The air heater 13 recovers heat of the flue gas 18 after denitrified and lowers a temperature of the flue gas 18. The heat-recovery unit 14 lowers the temperature of the flue gas 18 by performing heat exchange between the flue gas 18 which has passed through the air heater 13 and a circulating low-temperature heat medium from a reheater 26 hereinafter described. The precipitator 15 reduces dust, as precipitated ashes, in the flue gas 18 after the heat recovery in the heat-recovery unit 14. The desulfurization device 16 removes and reduces the sulfur oxides contained in the flue gas 18 which has passed through the precipitator 15 with a limestone-slurry (absorbent slurry) 20 containing limestone. The reheater 26 reheats the flue gas 18 desulfurized in the desulfurization device 16 by performing heat exchange with a circulating high-temperature heat medium from the heat-recovery unit 14. The stack 27 emits the flue gas heated in the reheater 26. The control device 28 controls an operation of each unit. The dehydrator 32 recovers gypsum 31 from an absorbent 30, which is a desulfurized sewage emitted from the desulfurization device 16. The limestone supply system 50 includes a limestone supply device 60 for reducing $SO_3$ in the flue gas (limestone supply device), a $SO_3$ measurement device (upstream $SO_3$ measurement device) 62, and a $SO_3$ measurement device (downstream $SO_3$ measurement device) 64. The limestone supply device 60 for reducing the $SO_3$ in the flue gas (limestone supply device) supplies limestone to a flue gas duct in an upstream of the heat-recovery unit 14. Furthermore, the limestone supply system 50 includes a limestone-slurry supply device (limestone supply device for the desulfurization device) 21 which is a part of the desulfurization device 16 and partial functions of the control device 28 of the air pollution control system 10. Furthermore, in the air pollution control system 10, the boiler 11, the denitrification device 12, the air heater 13, and the heat-recovery unit 14 are all coupled by a gas supply line $L_1$. The heat-recovery unit 14 and the precipitator 15 are coupled by a gas supply line $L_2$. The precipitator 15 and the desulfurization device 16 are coupled by a gas supply line $L_3$. Channels such as the gas supply lines $L_1$, $L_2$, $L_3$ and the like where the flue gas flows are the flue gas ducts. The flue gas is emitted from the boiler 11 and passes through the gas supply lines $L_1$, $L_2$, $L_3$ in the order mentioned. The flue gas which has passed through the desulfurization device 16 passes through the reheater 26 and is emitted from the stack 27. The limestone supply device 60 for reducing the $SO_3$ in the flue gas is coupled to the gas supply line $L_2$ and supplies limestone to the gas supply line $L_2$.

The denitrification device 12 is coupled to the boiler 11 through the gas supply line $L_1$ and is supplied with the flue gas emitted from the boiler 11 through the gas supply line $L_1$. The denitrification device 12 is a device which reduces the nitrogen oxides contained in the flue gas 18 and has a denitrification catalytic layer inside thereof. In a former stream of the denitrification catalytic layer, a reducing agent injector is disposed. A reducing agent is injected to the flue gas 18 from this reducing agent injector. Herein, examples of the reducing agent include ammonia, urea, and ammonium chloride. The nitrogen oxides in the flue gas 18 introduced to the denitrification device 12 is brought into contact with the denitrification catalytic layer so that the nitrogen oxides in the flue gas 18 is resolved into nitrogen gas ($N_2$) and water ($H_2O$) and removed. Accordingly, the flue gas 18 which has passed through the denitrification device 12 will be in a state where the nitrogen oxides are reduced and removed.

Note that the air pollution control system 10 may not include the denitrification device 12. The air pollution control system 10 may omit the denitrification device 12 in a case where concentration of the nitrogen oxides in the flue gas 18 from the boiler 11 is minute or in a case where such materials are not contained in the flue gas 18.

The air heater 13 is coupled to the denitrification device 12 through the gas supply line $L_1$ and is supplied through the gas supply line $L_1$ with the flue gas 18 which has passed through the denitrification device 12. The air heater 13 is a heat exchanger which recovers the heat in the flue gas 18. The air heater 13 recovers the heat of the flue gas 18 supplied through the gas supply line $L_1$ after the nitrogen oxides are reduced in the denitrification device 12, and lowers the temperature of the flue gas 18. The temperature of the flue gas 18 which has passed through the denitrification device 12 is high, for example, in a range from about 300° C. to 400° C. Therefore, the air heater 13 performs heat exchange between the high-temperature flue gas 18 with and normal-temperature combustion air. The temperature of the combustion air becomes high due to the heat exchange and the combustion air is supplied to the boiler 11. On the other hand, the flue gas 18, on which the heat exchange is performed with the combustion air in normal temperature, is cooled down, for example, in a range from about 150° C. to 180° C.

The heat-recovery unit 14 is coupled to the air heater 13 through the gas supply line $L_1$ and is supplied through the gas supply line $L_1$ with the flue gas 18 which has passed through the air heater 13. The heat-recovery unit 14 is a heat exchanger recovering the heat in the flue gas 18. The heat-recovery unit 14 recovers the heat of the flue gas 18 supplied through the gas supply line $L_2$ after the heat recovery in the air heater 13 and lowers the temperature of the flue gas 18. The heat-recovery unit 14 cools down the flue gas 18, for example, in a range from about 85° C. to 110° C.

The precipitator 15 is coupled to the heat-recovery unit 14 through the gas supply line $L_2$ and is supplied through the gas supply line $L_2$ with the flue gas 18 which has passed through the heat-recovery unit 14. The precipitator 15 removes dust, as precipitated ashes, contained in the flue gas 18 which has passed through the heat-recovery unit 14. Examples of the precipitator 15 include an inertial precipitator, a centrifugal precipitator, a filtration-type precipitator, an electronic precipitator, and a washing precipitator, but it should not be restricted thereto.

Furthermore, to the gas supply line $L_1$, coupled is the limestone supply device 60 for reducing the $SO_3$ in the flue gas. The limestone supply device 60 for reducing the $SO_3$ in the flue gas supplies powdered limestone to the gas supply line $L_2$. Accordingly, the limestone is mixed in the flue gas to be supplied to the heat-recovery unit 14. Note that the limestone supply device 60 for reducing the $SO_3$ in the flue gas will be described later.

The desulfurization device 16 is coupled to the precipitator 15 through the gas supply line $L_3$ and is supplied through the gas supply line $L_3$ with the flue gas 18 which has passed through the precipitator 15. The desulfurization device 16 is a device which reduces, with a wet-type method, the sulfur oxides in the flue gas 18 to be supplied through the gas supply line $L_3$. The desulfurization device 16 uses, for example, the limestone-slurry (solution dissolving the powdered limestone in water) 20 as an alkali absorbent and a temperature inside the device is adjusted to, for example, around 50° C. The limestone-slurry 20 is supplied to a reservoir in a bottom 22 of the desulfurization device 16 from the limestone-slurry supply device (the limestone supply device for the desulfurization device) 21. Furthermore, in the desulfurization device 16, the limestone to be supplied from the limestone supply device 60 for reducing the $SO_3$ in the flue gas is supplied together with the flue gas so that the limestone dissolves in the limestone-slurry and becomes a part of the alkali absorbent. The limestone-slurry 20 supplied to the bottom 22 of the desulfurization device 16 is transferred to a plurality of nozzles 23 inside the desulfurization device 16 through an absorbent-circulating line 25 and gushes out from the nozzles 23 toward a top 24. The absorbent-circulating line 25 is provided with a liquid-transfer pump 25a. As driving the liquid-transfer pump 25a, the limestone-slurry 20 is transferred from the absorbent-circulating line 25 to the nozzles 23. The flue gas 18 rising from the bottom 22 of the desulfurization device 16 is brought into gas-liquid contact with the limestone-slurry 20 gushing out of the nozzles 23. As a result, the sulfur oxides and mercury chloride in the flue gas 18 are absorbed by the limestone-slurry 20 and are separated and removed from the flue gas 18. The flue gas 18 purified by the limestone-slurry 20 is emitted as purification gas from the top 24 of the desulfurization device 16.

Inside the desulfurization device 16, the sulfur oxides $SO_x$ in the flue gas 18 react with the limestone-slurry 20, which is represented by the following Formula (1).

$$CaCO_3 + SO_2 + 0.5H_2O \rightarrow CaSO_3 \cdot 0.5H_2O + CO_2 \qquad (1)$$

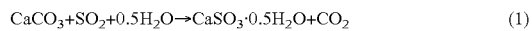

Furthermore, oxidation treatment is performed on the limestone-slurry 20 which has absorbed the $SO_x$ in the flue gas 18 by air (not illustrated) supplied to the bottom 22 of the desulfurization device 16. The limestone-slurry 20 reacts with the air, which is represented by the following Formula (2).

$$CaSO_3 \cdot 0.5H_2O + 0.5O_2 + 1.5H_2O \rightarrow CaSO_4 \cdot 2H_2O \qquad (2)$$

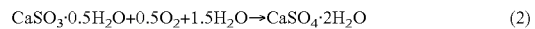

In such manners, the $SO_x$ in the flue gas 18 are caught in the desulfurization device 16 in a state of gypsum $CaSO_4 \cdot 2H_2O$.

Furthermore, as mentioned above, an example of the limestone-slurry 20 includes one obtained by pumping up liquid accumulated in the bottom 22 of the desulfurization device 16. This pumped limestone-slurry 20 is mixed with the gypsum $CaSO_4 \cdot 2H_2O$ by the reaction Formulas (1) and (2) together with an operation of the desulfurization device 16. Hereinafter, this pumped limestone-gypsum-slurry (the limestone-slurry mixed with the gypsum) will be referred to as the absorbent.

The absorbent (limestone-gypsum-slurry) 30 used for desulfurization is emitted to an outside through an absorbent line $L_{20}$ connected to the absorbent-circulating line 25 of the desulfurization device 16 and is transferred to the dehydrator 32 to be subjected to dehydration treatment. A dehydrated filtrate 33 is desulfurized sewage which contains heavy metals such as mercury and the like and halide ions such $Cl^-$, $Br^-$, $I^-$, $F^-$, and the like.

The dehydrator 32 separates solids including the gypsum 31 from the liquid dehydrated filtrate 33 in the absorbent 30. Examples of the dehydrator 32 include a belt filter, a centrifuge, and a decanter-type centrifugal settler. The absorbent 30 emitted from the desulfurization device 16 is separated into the gypsum 31 and the dehydrated filtrate 33 by the dehydrator 32.

The reheater 26 is disposed in the downstream of the desulfurization device 16 with respect to a flow direction of the flue gas 18. The reheater 26 is a heat exchanger which heats the flue gas 18. The reheater 26 heats the flue gas 18 which is to be supplied with the sulfur oxides being removed by the desulfurization device 16, and then raises the temperature of the flue gas 18. For example, the flue gas 18 is heated up to 90 degrees or more. The stack 27 is disposed in the downstream of the reheater 26 with respect to the flow direction of the flue gas 18. The stack 27 emits the flue gas 18 heated in the reheater 26 to an outside of the system. The air pollution control system 10 emits the flue gas from the stack 27 after heating it in the reheater 26 so as to restrain the flue gas emitted from the stack 27 from changing to white smoke and the like.

Next, hereinafter described is the limestone supply system 50 which supplies the limestone to the air pollution control system 10. As mentioned above, the limestone supply system 50 includes the limestone supply device 60 for reducing the $SO_3$ in the flue gas, the $SO_3$ measurement device (upstream $SO_3$ measurement device) 62, the $SO_3$ measurement device (downstream $SO_3$ measurement device) 64, the limestone-slurry supply device 21, and the control device 28. The limestone supply device 60 for reducing the $SO_3$ in the flue gas supplies the limestone to the flue gas duct in the upstream of the heat-recovery unit 14. The limestone-slurry supply device 21 supplies the limestone-slurry 20 to the bottom 22 as mentioned above. The limestone supply device 60 for reducing the $SO_3$ in the flue gas is coupled to the gas supply line $L_1$, as mentioned above, and supplies the powdered limestone to the gas supply line $L_1$. In the limestone supply system 50, the limestone supply device 60 for reducing the $SO_3$ in the flue gas supplies the limestone to the flue gas duct through which the flue gas flows, and the limestone-slurry supply device 21 supplies the limestone to the desulfurization device 16.

Figure 2:
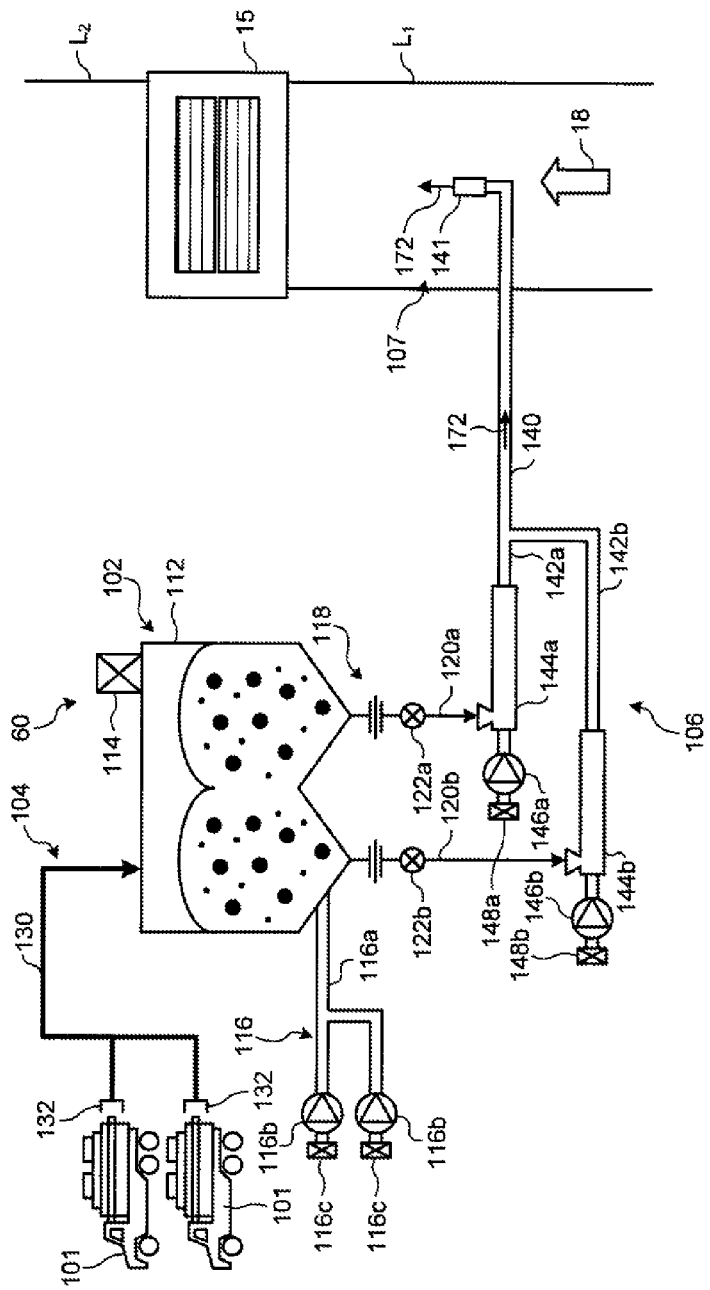
FIG. 2 is a schematic view illustrating an exemplary configuration of a limestone supply device for reducing $SO_3$ in flue gas in the air pollution control system.

With reference to FIG. 2, the limestone supply device 60 for reducing the $SO_3$ in the flue gas will be hereinafter described. FIG. 2 is a schematic view illustrating an exemplary configuration of the limestone supply device for reducing the $SO_3$ in the flue gas in the air pollution control system. Note that the limestone supply device 60 for reducing the $SO_3$ in the flue gas should not be restricted to the present embodiment, but various ways of supplying the limestone can be used if the limestone can be supplied to the gas supply line $L_1$. The limestone supply device 60 for reducing the $SO_3$ in the flue gas includes, as illustrated in FIG. 2, a limestone storage means 102, a limestone supply means 104, a limestone transfer means 106, and a limestone supply means 107.

The limestone storage means 102 includes a silo 112, a bag filter 114, an aeration system 116, and a limestone feeder 118. The silo 112 is a chamber storing the limestone (calcium carbonate, $CaCO_3$). The bag filter 114 is provided to a part of the silo 112, more specifically, a part of an upper side in a perpendicular direction. The bag filter 114 is a filter which air passes through but the limestone does not pass through. The bag filter 114 ventilates the air in a state where the limestone does not pass through from an inside to an outside of the silo 112.

The aeration system 116 includes an air supply line 116a, two blowers 116b, and two filters 116c. One end of the air supply line 116a is coupled to the silo 112, while the other end is branched into two lines coupled to the blowers 116b respectively. Furthermore, the other ends of the air supply line 116a have the filters 116c disposed therein. The filters 116c restrain solids from flowing from the other ends of the air supply line 116a. The air is restrained from flowing from the air supply line 116a to a direction toward the outside. Each of the two blowers 116b is coupled to the air supply line 116a. The blowers 116b supply the air to the air supply line 116a and allow the air to flow inside the silo 112 from the air supply line 116a. The aeration system 116 supplies the air from the air supply line 116a to the silo 112 by the blowers 116b so as to supply the air to a region of the silo 112 where the limestone is stored and to fluidize the limestone. Furthermore, by branching the air supply line 116a into two lines and by providing the blowers 116b to those lines respectively, the aeration system 116 can supply the air to the silo 112 consecutively.

The limestone feeder 118 includes feeder lines 120a, 120b and valves 122a, 122b. One ends of the feeder lines 120a, 120b are coupled to bottom of the silo 112, while the other ends thereof are coupled to the limestone transfer means 106. Note that the feeder lines 120a and 120b are coupled to different positions in the bottom of the silo 112. The valve 122a is provided to the feeder line 120a. The valve 122b is provided to the feeder line 120b. The limestone feeder 118 controls opening and closing of the valves 122a, 122b. By opening the valves 122a and 122b, the limestone feeder 118 supplies the limestone from the silo 112 to the limestone transfer means 106, and by closing the valves 122a and 122b, the limestone feeder 118 stops the supply of the limestone from the silo 112 to the limestone transfer means 106.

Next, the limestone supply means 104 includes a supply line 130 and a supply outlet 132 coupled to an end of the supply line 130. One end of the supply line 130 is coupled to the silo 112, while the other end thereof is coupled to the supply outlet 132. The supply outlet 132 is coupled to a truck 101 loaded with limestone. In the limestone supply means 104, the limestone loaded on the truck 101 flows from the supply outlet 132 to the supply line 130 and then is supplied to the silo 112.

Next, the limestone transfer means 106 includes a limestone supply line 140, branching lines 142a, 142b, mixing units 144a, 144b, blowers 146a, 146b, and filters 148a, 148b. The limestone supply line 140 supplies the limestone supplied from the limestone storage means 102 to the limestone supply means 107. One end of the limestone supply line 140 is coupled to each of the branching lines 142a and 142b, while the other end is coupled to the limestone supply means 107. Note that the other end of the limestone supply line 140 is coupled to the limestone supply means 107 disposed inside the gas supply line $L_2$ which is the flue gas duct so that the other end is inserted into the gas supply line $L_2$. The branching line 142a is coupled to the feeder line 120a. Inside a course of the branching line 142a, disposed are the mixing unit 144a, the blower 146a, and the filter 148a. One end of the branching line 142a is coupled to the limestone supply line 140, while the other end thereof is coupled to the filter 148a. The branching line 142a has the blower 146a, the mixing unit 144a, and portions connected to the feeder line 120a in this order with respect to a direction from the filter 148a to the limestone supply line 140.

The mixing unit 144a mixes the limestone to be supplied with air and pneumatically transfers the limestone. The limestone and the air mixed in the mixing unit 144a are supplied to the limestone supply line 140. The blower 146a is a fan blower transferring the air and transfers the air from the filter 148a to the limestone supply line 140. The filter 148a restrains the solids front flowing from the other end of the branching line 142a.

The branching line 142b is coupled to the feeder line 120b. Inside a course of the branching line 142b, disposed are the mixing unit 144b, the blower 146b, and the filter 148b. Note that a disposition of each part is similar to that of each part in the branching line 142a so that an explanation thereof will be omitted.

The limestone transfer means 106 mixes the limestone supplied from the feeder lines 120a, 120b and the air supplied from the blowers 146a, 146b with the mixing units 144a, 144b. As pneumatically transferring the limestone, the limestone transfer means 106 supplies the limestone from, the branching lines 142a, 142b to the limestone supply line 140. Limestone 172 supplied to the limestone supply line 140 is supplied to the limestone supply means 107.

Next, the limestone supply means 107 includes a nozzle 141. The nozzle 141 is disposed inside the gas supply line $L_1$ and is coupled to the end of the limestone supply line 140. The nozzle 141 injects the limestone supplied from the limestone supply line 140 to the gas supply line $L_1$. Note that the limestone supply means 107 uses power to transfer the limestone with the limestone transfer means 106, namely, power of the air transferred by the blowers 146a and 146b so as to inject the limestone 172 inside the gas supply line $L_1$.

Referring back to FIG. 1, the limestone supply system 50 will be hereinafter described. The $SO_3$ measurement device (upstream $SO_3$ measurement device) 62 measures the $SO_3$ in the flue gas 18 flowing through the gas supply line $L_1$ in a stream upper than the position where the limestone supply device 60 for reducing the $SO_3$ in the flue gas supplies the limestone. The $SO_3$ measurement device 62 measures $SO_3$ of the flue gas 18 flowing through the gas supply line $L_1$ between the precipitator 15 and the limestone supply device 60 for reducing the $SO_3$ in the flue gas. The $SO_3$ measurement device 62 may also measure either concentration of $SO_3$ or $SO_3$ content in the flue gas 18. Furthermore, the $SO_3$ measurement device 62 consecutively measures the concentration of $SO_3$. Examples of the $SO_3$ measurement device 62 include a Fourier Transform (FT-IR) type or a laser type infrared spectrophotometer. Furthermore, the $SO_3$ measurement device 62 may use a measurement system other than the infrared spectrophotometer.

The $SO_3$ measurement device (downstream $SO_3$ measurement device) 64 measures the $SO_3$ in the flue gas 18 flowing through the gas supply line $L_2$ which flows in a stream downer than the heat-recovery unit 14. The $SO_3$ measurement device 64 measures the $SO_3$ in the flue gas 18 flowing through the gas supply line $L_2$ between the heat-recovery unit 14 and the desulfurization device 16. The $SO_3$ measurement device 64 may measure either the concentration of $SO_3$ or the $SO_3$ content in the flue gas 18. Furthermore, the $SO_3$ measurement device 64 consecutively measures the concentration of $SO_3$. Examples of the $SO_3$ measurement device 64 includes the Fourier Transform (FT-IR) type or the laser type infrared spectrophotometer. Furthermore, the $SO_3$ measurement device 64 may use a measurement system other than the infrared spectrophotometer.

The control device 28 controls a quantity of the limestone to be supplied to the limestone supply device 60 for reducing the $SO_3$ in the flue gas and the limestone-slurry supply device 21, based on measurement results obtained by the $SO_3$ measurement device (upstream $SO_3$ measurement device) 62 and the $SO_3$ measurement device (downstream $SO_3$ measurement device) 64. The control device 28 controls not only the limestone supply system 50 but also an operation of each part in the air pollution control system 10. Note that the control device 28 may use either the whole measurement results or a part of the measurement results.

Figure 3:
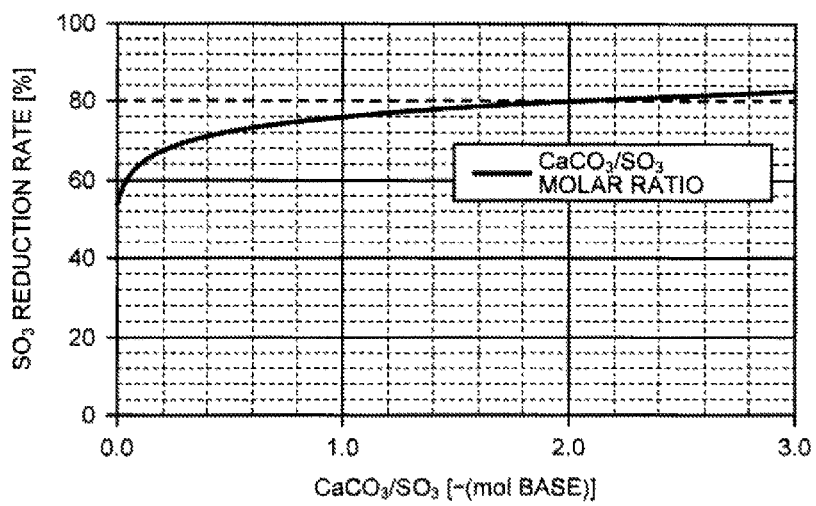
FIG. 3 is a graph illustrating an exemplary relationship between a molar ratio of $SO_3$ to $CaCO_3$ and a $SO_3$ reduction rate.
Figure 4:
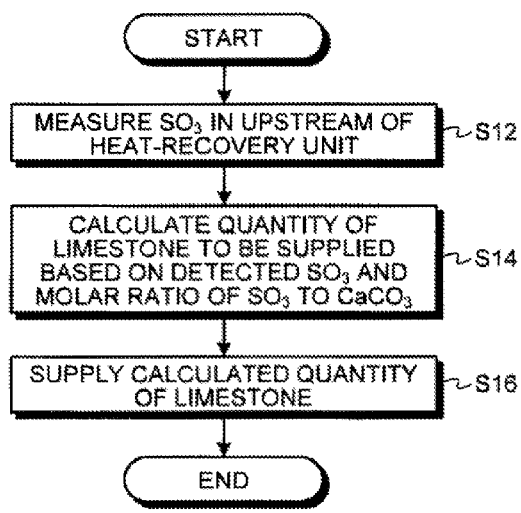
FIG. 4 is a flowchart illustrating an example of treatment of the air pollution control system.

Next, with reference to FIGS. 3 and 4, an example of an air pollution control method of the air pollution control system 10, more specifically, a method for supplying the limestone of the limestone supply system 50 will be described. FIG. 3 is a graph illustrating an exemplary relationship between a molar ratio of $SO_3$ to $CaCO_3$ and a $SO_3$ reduction rate. FIG. 4 is a flowchart illustrating an example of treatment of the air pollution control system.

First, the present inventors have found an relationship between the molar ratio of $SO_3$ to $CaCO_3$ and the $SO_3$ reduction rate as illustrated in FIG. 3 (also referred to as a $SO_3$ reduction characteristics curve.) More specifically, the present inventors have found that the $SO_3$ reduction rate can be adjusted by controlling the molar ratio of $SO_3$ to $CaCO_3$. Still more specifically, the inventors have found that the $SO_3$ reduction rate can be determined to be 80% or more by setting the molar ratio of $CaCO_3/SO_3$ to be 2.0 or more. Note that the relationship between the molar ratio of $SO_3$ to $CaCO_3$ and the $SO_3$ reduction rate slightly varies depending on particle-size distribution or dispersion conditions of the limestone as well as temperature circumstances. However, it has been found that a basic tendency can be arranged by a correlation curve similar to a correlation curve illustrated in FIG. 3.

The control device 28 determines the molar ratio of $SO_3$ to $CaCO_3$, in accordance with the relationship between the molar ratio of $SO_3$ to $CaCO_3$ and the $SO_3$ reduction rate ($SO_3$ reduction characteristics curve) illustrated in FIG. 3. The control device 28 then determines a quantity supplied of the limestone to be supplied from the limestone supply device 60 for reducing the $SO_3$ in the flue gas, based on the determined molar ratio of $SO_3$ to $CaCO_3$ and a quantity of the $SO_3$ measured by the $SO_3$ measurement device 62. The control device 28 then supplies the determined quantity supplied of the limestone from the limestone supply device 60 for reducing the $SO_3$ in the flue gas to the gas supply line $L_1$.

Hereinafter, an example of a control will be described with reference to FIG. 4. The treatment illustrated in FIG. 4 can be carried out when the control device 28 controls a limestone supply operation of the limestone supply device 60 for reducing the $SO_3$ in the flue gas based on information detected by the $SO_3$ measurement device 62 and a condition stored in advance, more specifically, a condition set in accordance with the relationship illustrated in FIG. 3. The control device 28 repeatedly carries out the treatment illustrated in FIG. 4.

The control device 28 detects $SO_3$ in the upstream of the heat-recovery unit 14 with using the $SO_3$ measurement device (upstream $SO_3$ measurement device) 62 (step S12). The control device 28 calculates the quantity of the $SO_3$ in the flue gas based on a detected result. The air pollution control system 10 may detect the quantity of the $SO_3$ with using the $SO_3$ measurement device (upstream $SO_3$ measurement device) 62. Alternatively, the air pollution control system 10 may detect the quantity of the $SO_3$ by arithmetizing the result detected by the $SO_3$ measurement device (upstream $SO_3$ measurement device) 62 with using the control device 28.

The control device 28 calculates the quantity of the limestone ($CaCO_3$) to be supplied based on a relationship between the detected quantity of the $SO_3$ and the molar ratio of $SO_3$ to $CaCO_3$ (step S14). The control device 28 stores a molar ratio of $SO_3$ to $CaCO_3$ determined based on a reference $SO_3$ reduction rate as well as the relationship between the molar ratio of $SO_3$ to $CaCO_3$ and the $SO_3$ reduction rate. Based on the determined molar ratio of $SO_3$ to $CaCO_3$ and the quantity of the $SO_3$, the control device 28 determines the necessary quantity of the limestone ($CaCO_3$) to be supplied with a value so that the detected quantity of the $SO_3$ and the quantity of the limestone ($CaCO_3$) to be supplied become equivalent to the determined molar ratio of $SO_3$ to $CaCO_3$.

The control device 28 calculates the quantity supplied of the limestone and then supplies the calculated quantity supplied of the limestone with the limestone supply device 60 for reducing the $SO_3$ in the flue gas (step S16).

The air pollution control system 10 can adsorb sulfur compounds (especially $SO_3$) contained in the flue gas 18 to the limestone by supplying the limestone to channels of the flue gas 18 in the upstream of the heat-recovery unit 14 with the limestone supply device 60 for reducing the $SO_3$ in the flue gas. Accordingly, even in a case where the temperature of the flue gas is lowered in the heat-recovery unit 14 and the temperature of $SO_3$ is lowered to the temperature equal to or lower than an acid dew-point, $SO_3$ is transferred together with the limestone in the flue gas 18. Therefore, $SO_3$ can be restrained from adhering to the heat-recovery unit 14 or the gas supply lines $L_2$, $L_3$. Accordingly, it is possible to restrain a clogging or corrosion from occurring inside courses of the air pollution control system 10. Furthermore, it is possible to recover considerable heat from the flue gas 18 by the heat-recovery unit 14 with restraint of the clogging and the corrosion.

Furthermore, the supplied limestone becomes the limestone-slurry 20 in the desulfurization device 16. Therefore, it is possible to apply the supplied limestone efficiently and restrain the limestone from emitting out of the course. Herein, the control device 28 preferably adjusts the quantity of the limestone supplied from the limestone supply device

60 for reducing the $SO_3$ in the flue gas and a quantity of the limestone-slurry supplied from the limestone-slurry supply device 21, based on concentration of the sulfur oxides of the flue gas 18. Accordingly, it is possible to supply the limestone necessary in the desulfurization device 16 to the desulfurization device 16 and also to supply the necessary limestone inside the gas supply line $L_2$.

Furthermore, the air pollution control system 10 appropriately controls a consumption amount of the supplied limestone with using the molar ratio of $SO_3$ to $CaCO_3$ so as to maintain the high $SO_3$ reduction rate and to restrain the quantity supplied of the limestone to be supplied from being excessive. In other words, by controlling the quantity of the limestone to be supplied with using the molar ratio of $SO_3$ to $CaCO_3$, it is possible to calculate with high accuracy the quantity supplied of the limestone which can obtain a desired $SO_3$ reduction rate. Accordingly, it is possible to maintain the high $SO_3$ reduction rate in high accuracy. Furthermore, since the necessary quantity of the limestone can be reliably calculated, it is possible to restrain increase in the quantity of the limestone to be supplied. For example, a case is considered where concentration of sulfur is high and the $SO_3$ in the flue gas is high due to fuel with inferior oil and the like. In this case, there is a possibility that the quantity of the limestone to be supplied from the limestone supply device 60 for reducing the $SO_3$ in the flue gas may increase to a quantity equal to or more than the quantity of the limestone necessary for the desulfurization device 16. Accordingly, limestone-containing concentration in the absorbent 30 will be excessive, which may lower gypsum purity of the gypsum 31. On the contrary, the limestone supply device 60 for reducing the $SO_3$ in the flue gas can reliably calculate the quantity of the limestone to be supplied in accordance with the $SO_3$ in the flue gas so as to use the limestone efficiently. Therefore, it is possible to restrain the quantity of the limestone to be supplied by the limestone supply device 60 for reducing the $SO_3$ in the flue gas to a required minimum quantity. Restraint of increase in the quantity supplied of the limestone leads to reducing costs. Furthermore, it is possible to restrain increase in the quantity of the limestone flowing in the flue gas duct, which reduces loads on devices in the downstream.

Herein, the control device 28 preferably determines the quantity supplied of the limestone ($CaCO_3$) within a range where the molar ratio of $CaCO_3/SO_3$ is set to be 2.0 or more. By determining the quantity supplied of the limestone ($CaCO_3$) within the range where the molar ratio of $CaCO_3/SO_3$ is set to be 2.0 or more, it is possible to set a target value of the $SO_3$ reduction rate up to 80% or more and to enhance the reduction rate of $SO_3$. Furthermore, the control device 28 can be used in, for example, a poor-grade coal combustion plant (an air pollution control system which treats flue gas emitted from a boiler combusting poor-grade coal). When the concentration of the $SO_3$ in the flue gas in an outlet of the air heater is in a range from about 15 to 30 ppm, it is preferable to determine the quantity supplied of the limestone ($CaCO_3$) within a range where the molar ratio of $CaCO_3/SO_3$ is set to be 2.0 or more and 10.0 or less. Furthermore, the control device 28 can be used in, for example, a heavy residual fuel combustion plant (an air pollution control system which treats flue gas emitted from a boiler combusting heavy residual fuel). When the concentration of the $SO_3$ in the flue gas in the outlet of the air heater is 50 ppm or more, it is preferable to determine the quantity supplied of the limestone ($CaCO_3$) within a range where the molar ratio of $CaCO_3/SO_3$ is set to be 15.0 or more. Furthermore, in a case where the concentration of the $SO_3$ in the flue gas in the outlet of the air heater is higher than the concentration of $SO_3$ of the flue gas caused by combustion of the heavy residual fuel, it is further preferable that the control device 28 further raises and determines the quantity supplied of the limestone ($CaCO_3$). By setting the molar ratio within the aforementioned range, the quantity supplied of the limestone can be controlled appropriately and the sulfur oxides can be removed efficiently.

In a case of performing feedforward control with the control device 28, it is preferable to set a reference value of molar ratio of $CaCO_3/SO_3$, and then to determine, as the quantity supplied of the $CaCO_3$, a quantity within an allowable range which has been set based on the reference value and the $SO_3$ reduction characteristics curve. The allowable range is a range of the molar ratio where the reference value is referred to as a criterion and the $SO_3$ reduction rate is set to be equivalent to the reference value (the set range) based on the $SO_3$ reduction characteristics curve. In such manners, by determining the quantity supplied of the limestone in a range within the allowable range where the molar ratio of $CaCO_3/SO_3$ of the set reference value is referred to as the criterion, it is possible not only to enhance the $SO_3$ reduction rate but also to restrain increase in the quantity of the limestone to be supplied. The allowable range is preferably set to be of 80% or less of the reference value. In other words, the allowable range is preferably set to satisfy the following: reference value−(reference value×0.8) or more, and reference value+(reference value×0.8) or less. By performing a control within the aforementioned range, the quantity supplied of the limestone can be controlled appropriately. Furthermore, a case is considered where the quantity supplied of the limestone to be supplied for removing $SO_3$ is oversupplied or undersupplied due to changes of the concentration of $SO_3$ and the like. In this case, as hereinafter described, it is possible to properly supply the limestone to be supplied for removing $SO_3$, for example, by consecutively measuring the concentration of the $SO_3$ in the flue gas in the downstream of the heat-recovery unit as well as performing feedback control for adjusting the quantity supplied of the limestone to be supplied for removing $SO_3$ in accordance with the measured values.

Herein, the treatment in FIG. 4 solely uses the measurement result of the $SO_3$ measurement device 62 in the upstream of the heat-recovery unit 14 to control the quantity of the limestone to be supplied from the limestone supply device 60 for reducing the $SO_3$ in the flue gas. However, it is preferable to also use the measurement result of the $SO_3$ measurement device 64 in the downstream of the heat-recovery unit 14.

Figure 5:
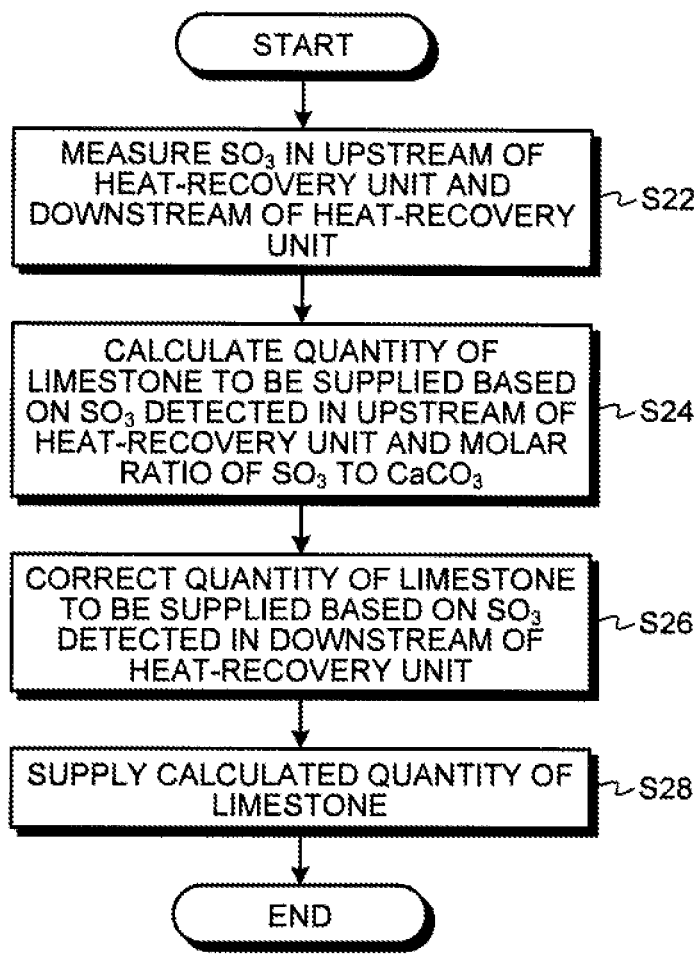
FIG. 5 is a flowchart illustrating an example of the treatment of the air pollution control system.

With reference to FIG. 5, hereinafter described is an example of treatment where the quantity of the limestone supplied from the limestone supply device 60 for reducing the $SO_3$ in the flue gas is controlled as taking into account the measurement result of the $SO_3$ measurement device 64 in the downstream of the heat-recovery unit 14. FIG. 5 is a flowchart illustrating an example of treatment of the air pollution control system.

The control device 28 detects $SO_3$ in the upstream of the heat-recovery unit 14 with using the $SO_3$ measurement device (upstream $SO_3$ measurement device) 62 and detects $SO_3$ in the downstream of the heat-recovery unit 14 with using the $SO_3$ measurement device (downstream $SO_3$ measurement device) 64 (step S22). The control device 28 calculates the quantity of the $SO_3$ in the flue gas in the upstream of the heat-recovery unit 14 based on a detected result obtained by the $SO_3$ measurement device (upstream $SO_3$ measurement device) 62. The air pollution control system 10 may detect the quantity of the $SO_3$ with using the $SO_3$ measurement device (upstream $SO_3$ measurement device) 62. Alternatively, the air pollution control system 10 may detect the quantity of the $SO_3$ by arithmetizing the result detected by the $SO_3$ measurement device (upstream $SO_3$ measurement device) 62 with using the control device 28. The control device 28 calculates the quantity of the $SO_3$ in the flue gas in the downstream of the heat-recovery unit 14 based on a detected result obtained by the $SO_3$ measurement device (downstream $SO_3$ measurement device) 64. The quantity of the $SO_3$ in the flue gas in the downstream of the heat-recovery unit 14 can also be calculated by a similar method used for calculating the quantity of the $SO_3$ in the flue gas in the upstream of the heat-recovery unit 14.

The control device 28 calculates the quantity of the limestone ($CaCO_3$) to be supplied based on the relationship between the detected quantity of the $SO_3$ in the upstream of the heat-recovery unit 14 and the molar ratio of $SO_3$ to $CaCO_3$ (step S24). The control device 28 stores a molar ratio of $SO_3$ to $CaCO_3$ determined based on a reference $SO_3$ reduction rate as well as the relationship between the molar ratio of $SO_3$ to $CaCO_3$ and the $SO_3$ reduction rate. Based on the determined molar ratio of $SO_3$ to $CaCO_3$ and the quantity of the $SO_3$, the control device 28 determines the quantity of the limestone ($CaCO_3$) with the value where the detected quantity of the $SO_3$ and the quantity of the limestone ($CaCO_3$) to be supplied become equivalent to the determined molar ratio of $SO_3$ to $CaCO_3$.

The control device 28 uses the quantity of the $SO_3$ in the upstream of the heat-recovery unit 14 to determine the quantity supplied of the limestone, and then corrects the quantity of the limestone to be supplied based on the quantity of the $SO_3$ detected in the downstream of the heat-recovery unit 14 (step S26). In other words, the control device 28 corrects the calculated quantity supplied of the limestone based on the actual quantity of the $SO_3$ in the flue gas which has passed through the heat-recovery unit 14. The control device 28 corrects the quantity of the limestone and then supplies the calculated quantity of the limestone with the limestone supply device 60 for reducing the $SO_3$ in the flue gas (step S28).

As illustrated in FIG. 5, the air pollution control system 10 detects $SO_3$ in the downstream of the heat-recovery unit 14 with using the $SO_3$ measurement device (downstream $SO_3$ measurement device) 64. Based on the detected result, the air pollution control system 10 corrects the quantity of the limestone supplied from the limestone supply device 60 for reducing the $SO_3$ in the flue gas so that the quantity supplied of the limestone can be controlled appropriately. In other words, the quantity supplied of the limestone can be controlled more appropriately by performing cascade control. The cascade control combines a feedforward control using the measurement result obtained by the $SO_3$ measurement device (upstream $SO_3$ measurement device) 62 with a feedback control using the measurement result of the $SO_3$ measurement device (downstream $SO_3$ measurement device) 64. Furthermore, in FIG. 5, the treatments of step S24 and step S26 are separated but may be carried out by one treatment with one arithmetic formula.

Preferably, the control device 28 controls the quantity of the limestone to be supplied from the limestone-slurry supply device 21 in addition to the quantity of the limestone to be supplied from the limestone supply device 60 for reducing the $SO_3$ in the flue gas. The control device 28 determines the quantity of the limestone to be supplied from the limestone-slurry supply device 21, as taking into account the quantity of the limestone to be supplied from the limestone supply device 60 for reducing the $SO_3$ in the flue gas based on the detected quantity of the $SO_3$ and the molar ratio of $SO_3$ to $CaCO_3$. Then the control device 28 can restrain increase in the quantity of the limestone to be supplied from the limestone-slurry supply device 21.

Figure 6:
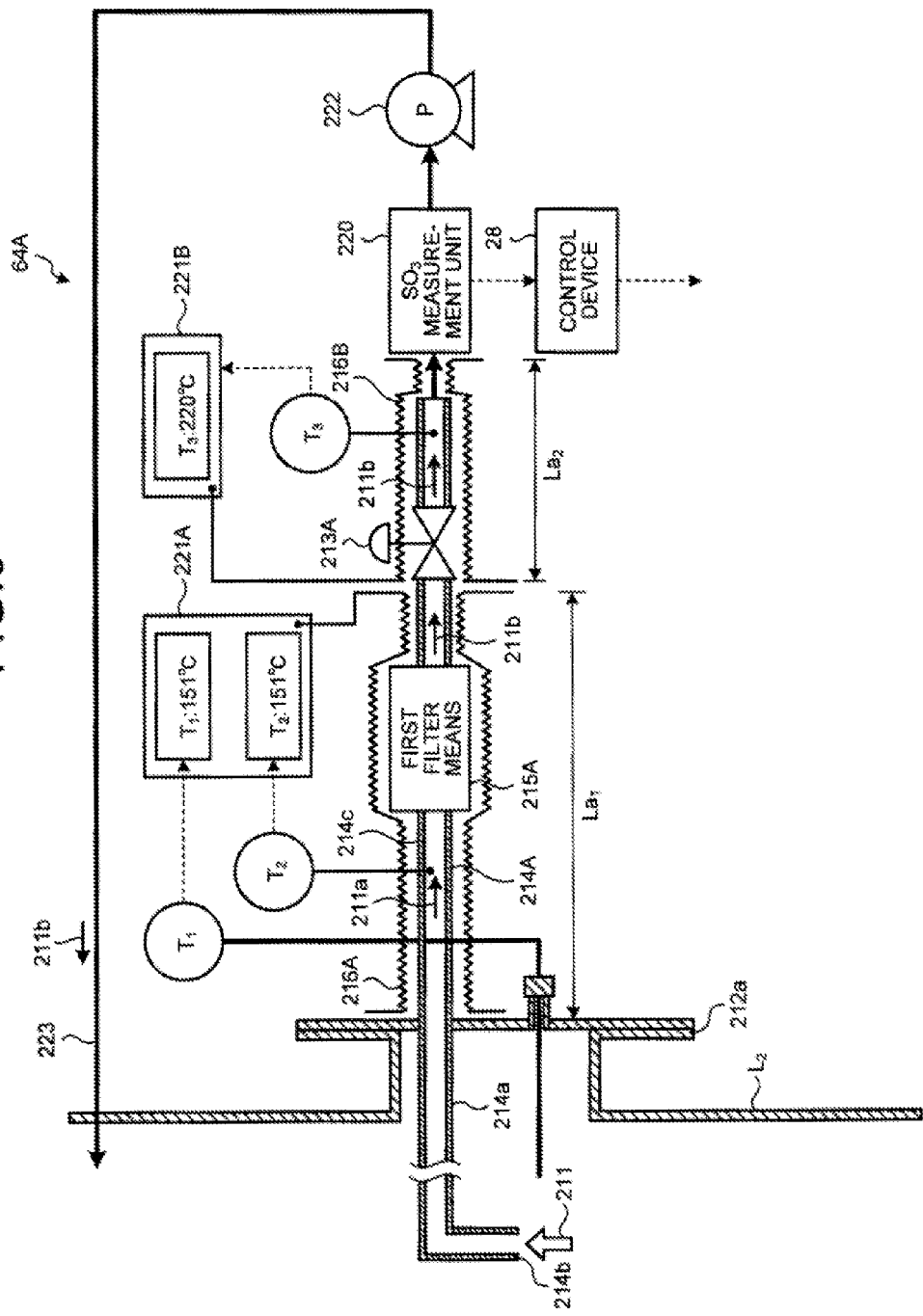
FIG. 6 is a schematic view illustrating an example of a $SO_3$ measurement device.
Figure 7:
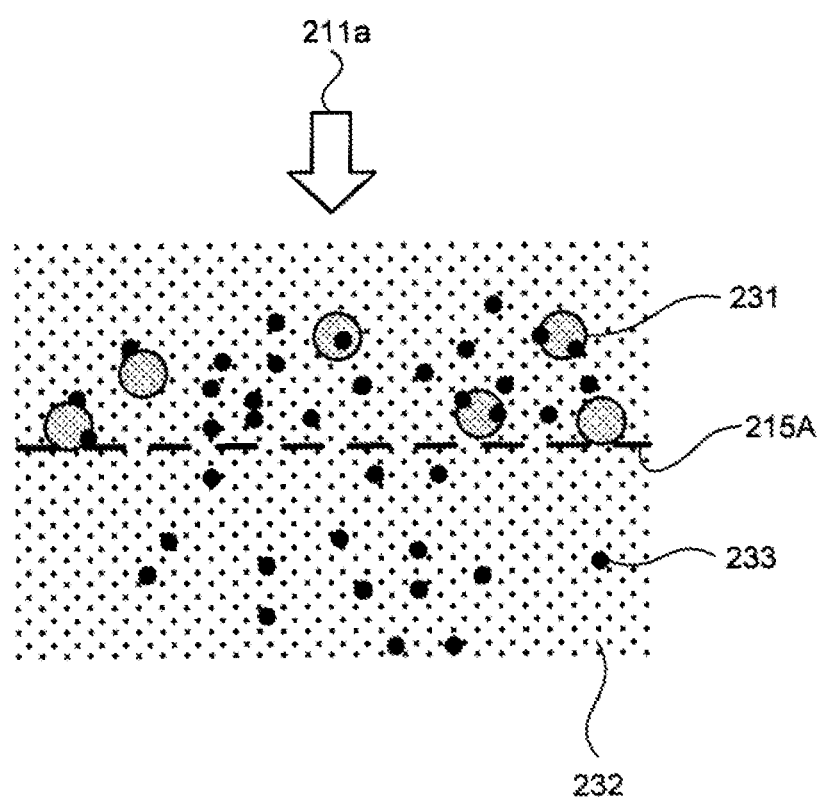
FIG. 7 is a conceptual view of flue gas passing through a first filter means.

Next, with reference to FIGS. 6 and 7, a $SO_3$ measurement device preferably applicable to the present-embodiment will be described. The $SO_3$ measurement device illustrated in FIGS. 6 and 7 is applicable to both the $SO_3$ measurement device (upstream $SO_3$ measurement device) 62 and the $SO_3$ measurement device (downstream $SO_3$ measurement device) 64. Especially, it is preferably applicable to the $SO_3$ measurement device (downstream $SO_3$ measurement device) 64.

FIG. 6 is a schematic view illustrating an example of the $SO_3$ measurement device. FIG. 7 is a conceptual view of the flue gas passing through a first filter means. As illustrated in FIG. 6, the $SO_3$ measurement device 64A is configured to include a first, gas introduction line 214A, a $SO_3$ measurement unit 220, a first filter means 215A, a first heating means 216A, and a second heating means 216B. The first gas introduction line 214A is provided with a first opening-and-closing valve 213A which introduces flue gas 211 containing $SO_3$ from the gas supply line $L_2$. The $SO_3$ measurement unit 220 is coupled to the first gas introduction line 214A and measures gaseous $SO_3$ in the flue gas 211. The first filter means 215A is disposed in the first gas introduction line 214A and captures dust in the introduced flue gas 211a and also allows gaseous $SO_3$ and mist-like $SO_3$ to selectively pass through. The first heating means 216A heats a first heating region $La_1$ ranging from a flange 212a of the gas supply line $L_2$ of the first gas introduction line 214A to the first opening-and-closing valve 213A up to a temperature equivalent to a gas temperature ($T_1$) of the flue gas 211 inside the gas supply line $L_2$. The first heating means 216A also retains a gas temperature of the introduced flue gas 211a ($T_2$: illustrated example 151° C.) to be equivalent to the gas temperature inside the gas supply line $L_2$ ($T_1$: illustrated example 151° C.). The second heating means 216B heats a second heating region $La_2$ ranging from the opening-and-closing valve 213A of the first gas introduction line 214A to an inlet of the $SO_3$ measurement unit 220 up to a temperature where the $SO_3$ retains a gaseous state inside the gas introduction line (200° C. or more, $T_3$: illustrated example 220° C.) and retains the temperature. Furthermore, the $SO_3$ measurement device 64A is configured to convert the mist-like $SO_3$ in the flue gas 211b after passing through the first filter means 215A to the gaseous $SO_3$ by heating the second heating means 216B. The $SO_3$ measurement device 64A. is configured to measure total concentration of the gaseous $SO_3$ and the gaseous $SO_3$ converted from, the mist-like $SO_3$ with using the $SO_3$ measurement unit 220. Furthermore, the $SO_3$ measurement device 64A includes a first temperature control, device 221A, a second temperature control device 221B, a gas suction pump 222, and a gas return line 223.

The first gas introduction line 214A includes a gas introduction unit 214a inserted into the gas supply line $L_2$ from the flange 212a and an introduction pipe 214c connecting the gas introduction unit 214a and the $SO_3$ measurement unit 220. The gas introduction unit 214a has an opening 214b formed therein as opposing to a gas flow of the flue gas 211 so as to introduce the flue gas 211. In the introduction pipe 214c, the first heating region $La_1$ including the flange 212a of the gas supply line $L_2$, the first filter means 215A, and the first opening-and-closing valve 213A is wound by, for example, a heater which is the first heating means 216A. The first heating means 216A heats an inside of the first heating region $La_1$ to the temperature equivalent to the gas temperature ($T_1$) of the flue gas 211 inside the gas supply line $L_2$. The first heating means 216A then retains the gas temperature of the flue gas 211a introduced to the first gas introduction line 214A to be at the temperature ($T_2$: illustrated example 151° C.) equivalent to the gas temperature inside the gas supply line $L_2$ ($T_1$: illustrated example 151° C.)

Accordingly, the first gas introduction line 214A inside the first heating region Lai is set to be in a condition equivalent to a condition inside the flue gas duct. Due to the equivalent condition, the flue gas 211a to be introduced includes the gaseous $SO_3$, the mist-like $SO_3$, and the dust in a proportion equivalent, to a proportion inside the gas supply line $L_2$.

FIG. 7 is a conceptual view of the flue gas-passing through a first filter means. As illustrated in FIG. 7, the first filter means 215A disposed in the first gas introduction line 214A solely captures dust 231 in the introduced flue gas 211a and also selectively allows gaseous $SO_3$ 232 and mist-like $SO_3$ 233 to pass through. As a result, the gaseous $SO_3$ 232 and the mist-like $SO_3$ 233, from which the dust 231 is removed, exist in the flue gas 211b which has passed through the first filter means 215A.

Herein, the second heating region $La_2$ ranging from the first opening-and-closing valve 213A to the inlet of the $SO_3$ measurement unit 220 is heated and retained by the second heating means 216B at the temperature where $SO_3$ retains the gaseous state inside the first gas introduction line 214A (for example, 200° C. or more, $T_3$: illustrated example 220° C.). Accordingly, with regards to the flue gas 211b from which the dust 231 is removed and which has passed through the first opening-and-closing valve 213A, when passing through the second heating region $La_2$, the mist-like $SO_3$ 233 in the flue gas 211b is converted to the gaseous $SO_3$ 232 so that the whole flue gas 211b is converted to the gaseous $SO_3$.

By measuring this gaseous $SO_3$ with the $SO_3$ measurement unit 220, it is possible to measure a total quantity of the gaseous and mist-like $SO_3$ in the flue gas 211 inside the gas supply line $L_2$.

In other words, the gaseous $SO_3$ and the mist-like $SO_3$ coexist inside the gas supply line $L_2$. When introduced by the first gas introduction line 214A, the gaseous $SO_3$ and the mist-like $SO_3$ are introduced by a heat trace control at a temperature equivalent to the temperature of the flue gas 211. Then, the first filter means 215A solely captures the dust 231 and selectively allows the mist-like $SO_3$ 223 and the gaseous $SO_3$ 232 to pass through. Furthermore, after passing through the first filter means 215A, the $SO_3$ is heated in the second heating region $La_2$ to a temperature of "acid dew-point+dozens of degrees Celsius" or more so that the $SO_3$ retains the gaseous state inside the first gas introduction line 214A. As being gasified, $SO_3$ mist is entirely converted to the gaseous $SO_3$ and is introduced to the $SO_3$ measurement unit 220. As a result, a sum of the originally existing gaseous $SO_3$ 232 and the gaseous $SO_3$ gasified from the mist-like $SO_3$ 233 is detected as the concentration of $SO_3$.

Herein, the second heating region $La_2$ is preferably set to be at the temperature where the $SO_3$ retains the gaseous state inside the first gas introduction line 214A, for example, the acid dew-point+dozens of degrees Celsius or more. However, the acid dew-point varies depending on the concentration of the $SO_3$ and water content in the flue gas 211. Therefore, 200° C. or more is preferable in the present invention (in the embodiment, $T_3$: illustrated example 220° C. is applied as an example).

Accordingly, the mist-like $SO_3$ existing in the flue gas 211b after passing through the first filter means 215A will be entirely gasified to the gaseous $SO_3$.

As a result, it is possible to measure concentration of the mist-like $SO_3$ as concentration of $SO_3$, which the related art could not measure.

Herein described is the first filter means 215A which captures the dust in the introduced flue gas 211a and selectively allows the gaseous $SO_3$ and the mist-like $SO_3$ to pass through. Examples of the first filter means 215A include any kinds of means if those means can solely capture the dust 231 and selectively allow the mist-like $SO_3$ and the gaseous $SO_3$ to pass through.

Such examples include a filter and the like using a ceramic filter paper with a mesh size equivalent to a particle size of the dust 231, an inertial filter, a metal-mesh filter which does not react with $SO_2$ and $SO_3$, a filter obtained from a metallic porous body, and a ceramic filter capable of backwashing with a similar mesh size.

Furthermore, other applicable examples are an electrostatic filter (a filter with a fixed electric polarity), an electric field filter (a filter capable of removing dust and media as randomly changing an electric polarity), and the like.

However, these filter means should be occasionally replaced by brand-new filter means. Alternatively, under a condition of a conspicuous clogging, it is preferable to remove stored dust of the filter means as maintenance operation. Furthermore, it is preferable to perform heat-treatment at a high temperature and gasify stored $SO_3$ or, for example, dust mainly containing unburned carbon in combustion flue gas of an oil combustion thermal power plant so as to release the gasified $SO_3$ or the gasified dust.

Figure 8:
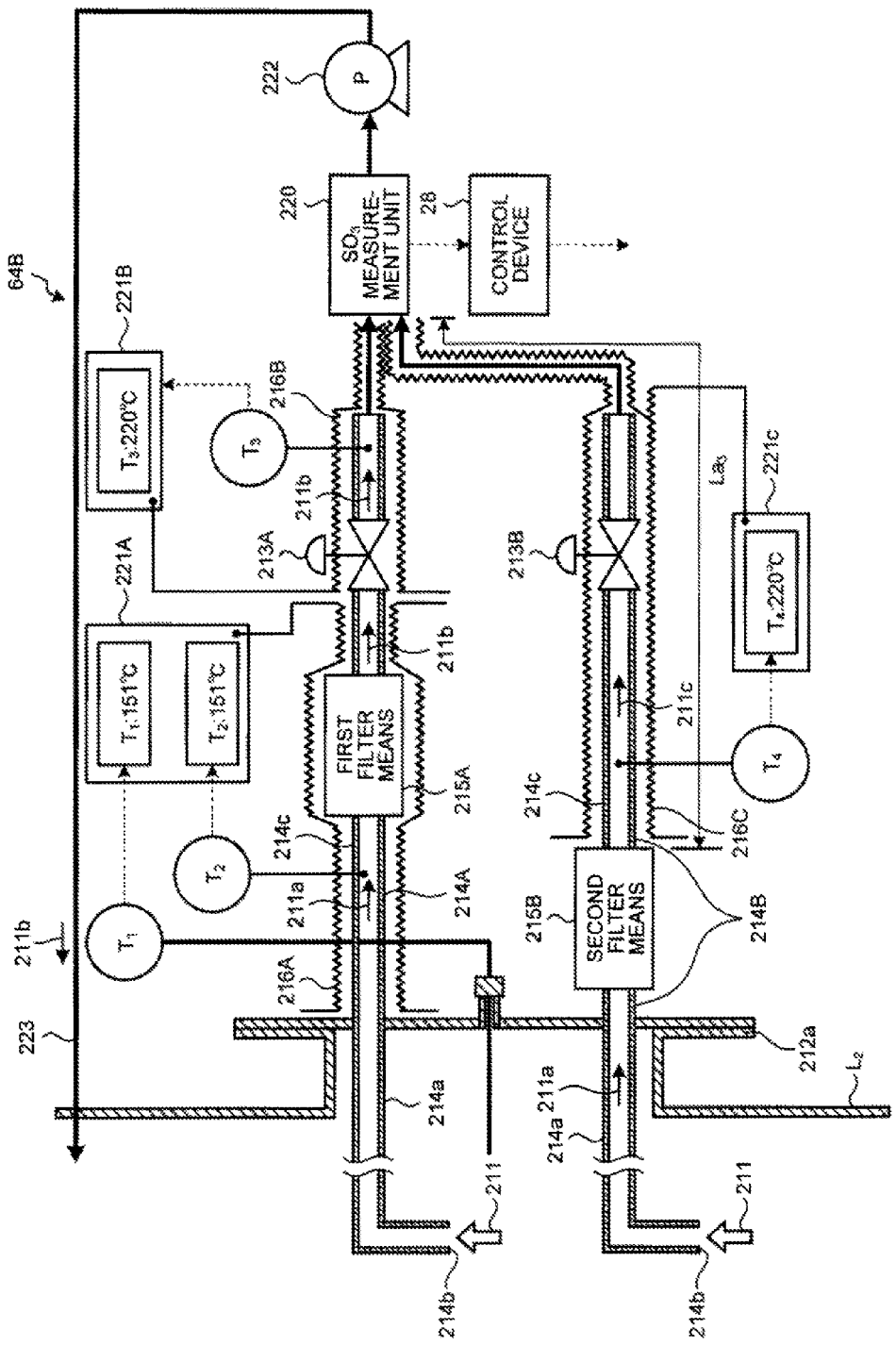
FIG. 8 is a schematic view illustrating an example of the $SO_3$ measurement device.
Figure 9:
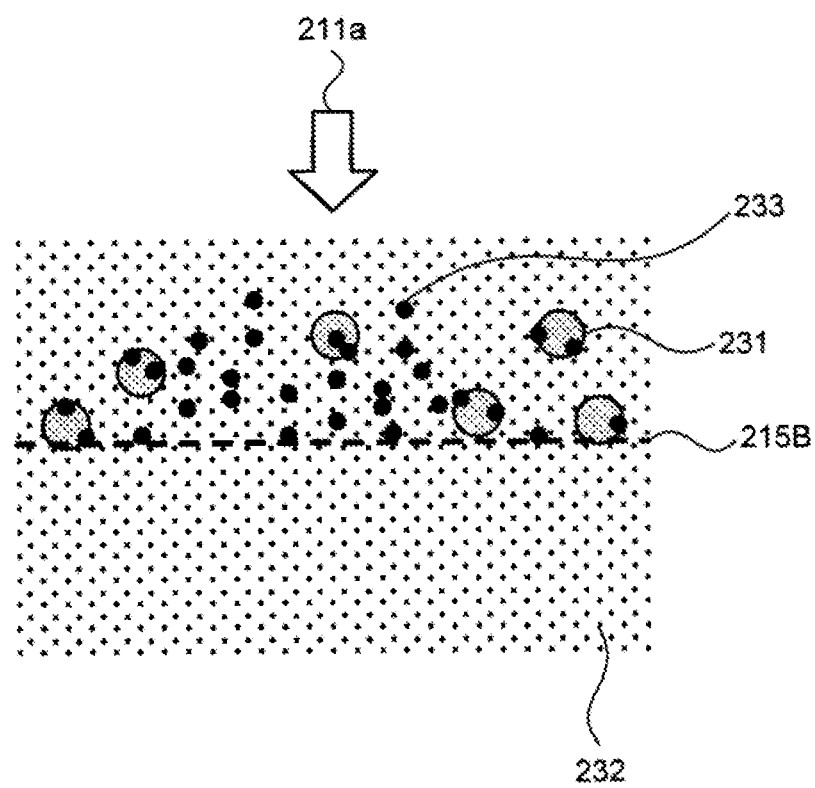
FIG. 9 is a conceptual view of the flue gas passing through a second filter means.
Figure 10:
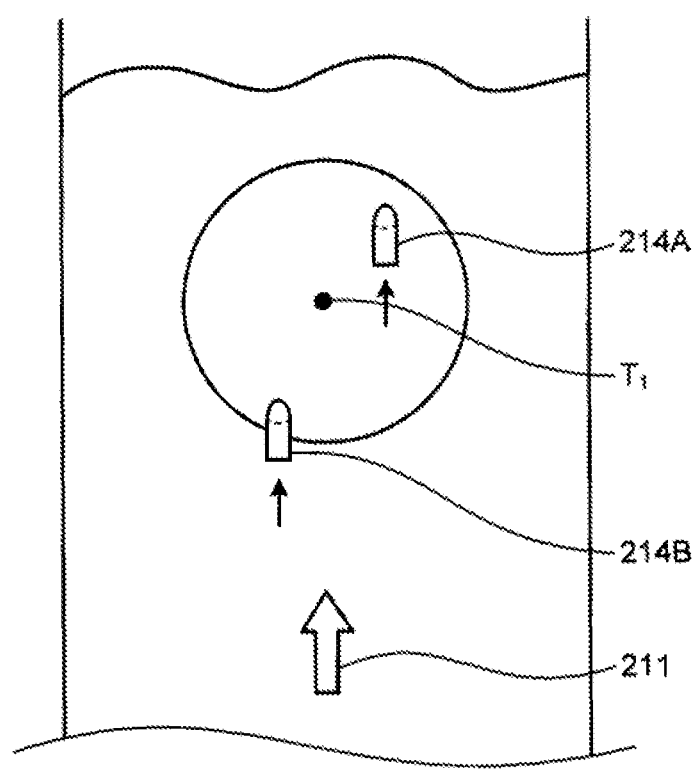
FIG. 10 is a view for explaining sampling inside a flue gas duct.

Next, with reference to FIGS. 8 to 10, other examples of the $SO_3$ measurement device will be described. FIG. 8 is a schematic view illustrating an example of the $SO_3$ measurement device. FIG. 9 is a conceptual view of flue gas passing through a second filter means. FIG. 10 is a view for explaining sampling inside the flue gas duct.

As illustrated in FIG. 8, in addition to the aforementioned members of the $SO_3$ measurement device 64A measuring the $SO_3$ in the flue gas, a $SO_3$ measurement device 64B is configured to include a second gas introduction line 214B, a $SO_3$ measurement unit 220, a second filter means 215B, and a third heating means 216C. The second gas introduction line 214B is provided with a second opening-and-closing valve 213B which introduces the flue gas 211 containing $SO_3$ from the gas supply line $L_2$. The $SO_3$ measurement unit 220 is coupled to the second gas introduction line 214B and measures gaseous $SO_3$ in the flue gas 211. The second filter means 215B disposed in the second gas introduction line 214B, and captures both mist-like $SO_3$ and dust in the introduced flue gas 211a and selectively allows the gaseous $SO_3$ to pass through. The third heating means 216C heats a third heating region $La_3$, ranging from a part after the second filter means 215B to the $SO_3$ measurement unit 220, of the second gas introduction line 214B and retains a gas temperature of the flue gas 211c after passing through the second filter means 215B at a high temperature (200° C. or more where $SO_3$ retains a gaseous state (temperature of $SO_3$ acid dew-point+dozens of degrees Celsius), $T_4$: 220° C.). Furthermore, the $SO_3$ measurement device 64B is configured to measure concentration of the gaseous $SO_3$ in flue gas 211c after passing through the second filter means 215B with using $SO_3$ measurement unit 220. The $SO_3$ measurement device 64B also heats the mist-like $SO_3$ in the flue gas 211b after passing through the first filter means 215A to convert the mist-like $SO_3$ into the gaseous $SO_3$ so as to measure total concentration of the gaseous $SO_3$ contained in the flue gas with using the $SO_3$ measurement unit 220. Then, the $SO_3$ measurement device 64B obtains, as concentration of the mist-like $SO_3$, a difference (Z) between the total concentration of $SO_3$ (X) of the gaseous $SO_3$ which has passed through the first filter means 215A and the concentration (Y) of the gaseous $SO_3$ which has passed through the second filter means 215B.

By preparing two sampling lines in such manners, it is possible to independently measure the concentration of the gaseous $SO_3$ of the flue gas 211 as well as the concentration of the mist-like $SO_3$ and the gaseous $SO_3$ thereof so that the concentration of the mist-like $SO_3$ can be arithmetized based on the difference. Then, an arithmetic result is displayed on a displaying means and the like by the control device 28.

In other words, a $SO_3$ sampling line is configured to include two lines, that is, the first gas introduction line 214A and the second gas introduction line 214B. In a case of measurement, those lines are controlled by switching opening-and-closing valves 213A, 213B respectively. Alternatively, a plurality of $SO_3$ concentration meters may be prepared so that each concentration meter is coupled to the line so as to measure in parallel.

Hereinafter described is a case where concentration of arbitrary phase is measured by switching the opening-and-closing valves 213A, 213B. First, in a case of measuring the gaseous $SO_3$, the second gas introduction line 214B is heated to a temperature of 200° C. or more ($SO_3$ acid dew-point+dozens of degrees Celsius) so that the gaseous $SO_3$ solely passes through the second filter means 215B which has a small pore size capable of capturing dust and aerial mist-like $SO_3$. Then, the gaseous $SO_3$ is introduced to the $SO_3$ measurement unit 220 which measures gas concentration of $SO_3$ so as to measure the concentration of $SO_3$ at this moment.

Next, in a case of measuring a total of the gaseous and mist-like $SO_3$, the heat trace control is performed on the first gas introduction line 214A illustrated in FIG. 8 at a temperature equivalent to the temperature of the flue gas temperature ($T_1$) so that the flue gas 211a is introduced to the first gas introduction line 214A. Then, the first filter means 215A which the mist-like $SO_3$ passes through solely captures the dust and selectively allows the mist-like $SO_3$ and the gaseous $SO_3$ to pass through. Furthermore, after passing through the first filter means 215A, the second heating means 216B heats the first gas introduction line 214A to the acid dew-point+dozens of degrees Celsius or more ($T_3$: 220° C.) so that the mist-like $SO_3$ in the flue gas 211b is gasified and introduced to the $SO_3$ measurement unit 220. A sum of the concentration of the gaseous $SO_3$ and the concentration of the mist-like $SO_3$ is detected as the concentration of $SO_3$.

FIG. 9 is a conceptual view of the flue gas passing through the second filter means. As illustrated in FIG. 9, the second filter means 215B disposed in the second gas introduction line 214B captures both the dust 231 in the introduced flue gas 211a and the mist-like $SO_3$ 233 and also selectively solely allows the gaseous $SO_3$ 232 to pass through.

As a result, in the flue gas 211c which has passed through the second filter means 215B, there exists the gaseous $SO_3$ 232 from which the dust 231 and the mist-like $SO_3$ 233 are removed. Note that FIG. 10 is a view illustrating the sampling inside the flue gas duct. The two gas introduction lines 214A, 214B are disposed as being offset in the flow of the flue gas 211 so that those sampling outlets will not overlap each other. Accordingly, it is possible to understand the concentration of the mist-like $SO_3$ contained in the flue gas.

Figure 11:
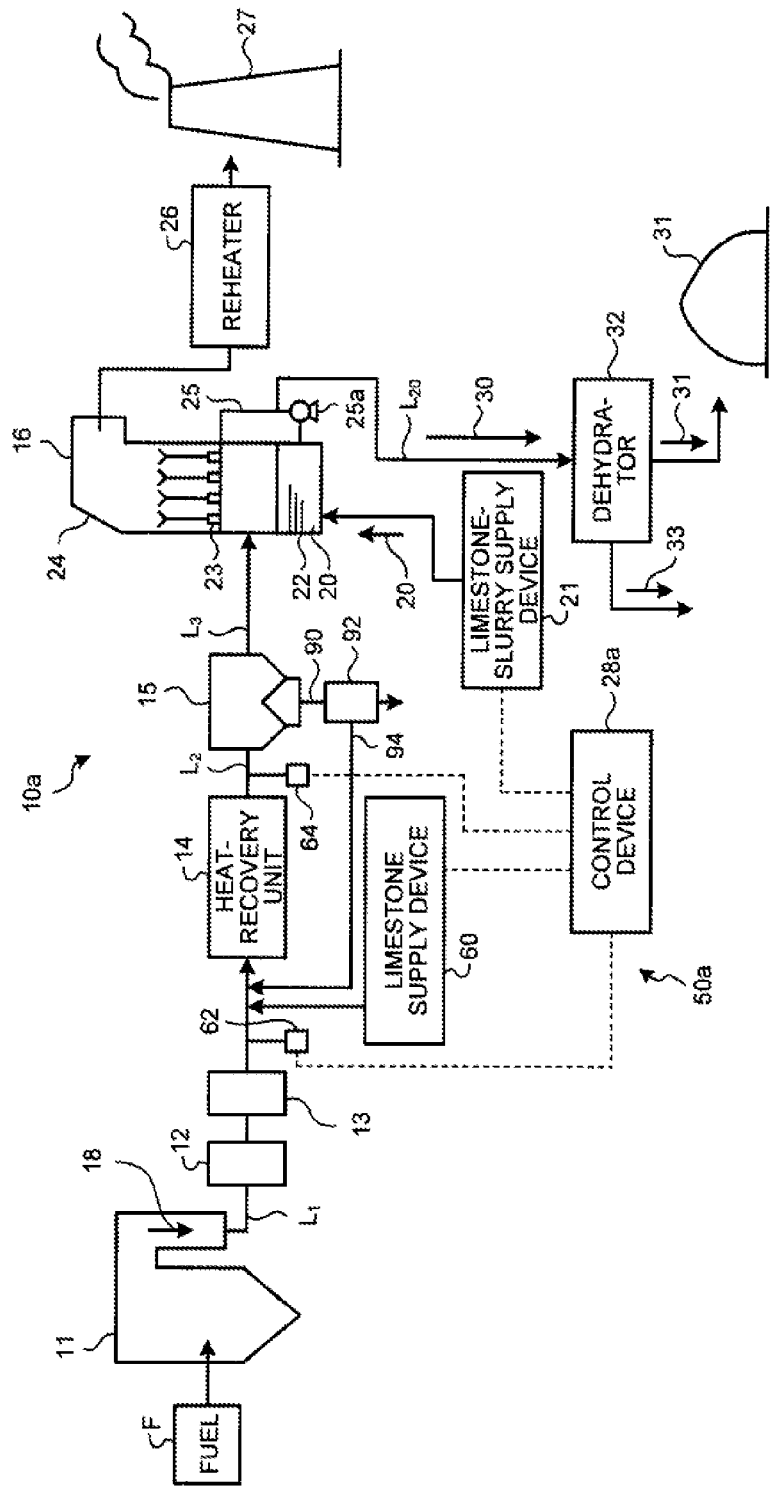
FIG. 11 is a schematic view of a configuration of an air pollution control system according to another embodiment.
Figure 12:
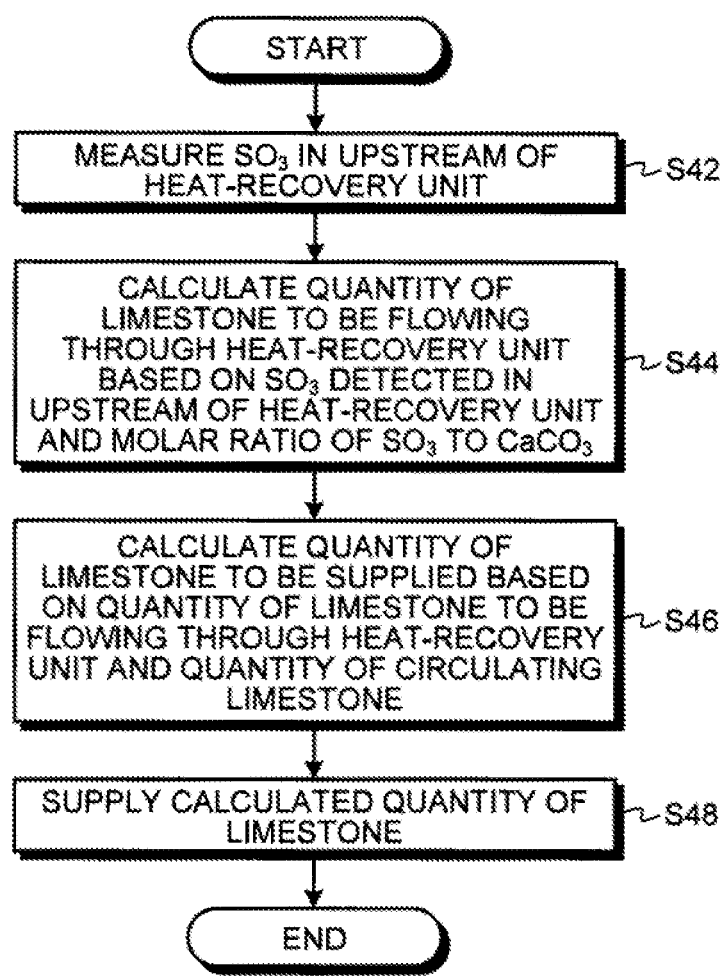
FIG. 12 is a flowchart illustrating an example of treatment of the air pollution control system of another embodiment.

Next, with reference to FIGS. 11 and 12, an air pollution control system according to another embodiment will be described. FIG. 11 is a schematic view of a configuration of the air pollution control system according to another embodiment. An air pollution control system 10a illustrated in FIG. 11 has a configuration similar to that of the air pollution control system 10 illustrated in FIG. 1 except for a limestone supply system 50a. Among the elements in the air pollution control system 10a, explanations for those having similar configurations to those of the air pollution control system 10 will be omitted and points that are particular to the air pollution control system 10a will be hereinafter described.

The limestone supply system 50a of the air pollution control system 10a according to the present embodiment includes the limestone supply device 60 for reducing the $SO_3$ in the flue gas, the $SO_3$ measurement device (upstream $SO_3$ measurement device) 62, the $SO_3$ measurement device (downstream $SO_3$ measurement device) 64, a dust emission line 90, a sorting means 92, and a circulation line 94. The limestone supply device 60 for reducing the $SO_3$ in the flue gas supplies limestone to the flue gas duct in the upstream of the heat-recovery unit 14. The dust emission line 90 emits dust recovered in the precipitator 15. The sorting means 92 separates the dust supplied from the dust emission line 90 into ashes to be disposed of and recycle-limestone to be recycled. The circulation line 94 supplies the recycle-limestone separated by the sorting means 92 to the upstream of the heat-recovery unit 14. Furthermore, the limestone supply system 50a includes the limestone-slurry supply device 21 which is a part of the desulfurization device 16 and partial functions of the control device 28a of the air pollution control system 10a.

The limestone supply system 50a supplies the limestone collected in the precipitator 15 to the gas supply line $L_1$ again with using the dust emission line 90 and the sorting means 92 and the circulation line 54. The emission line 90 emits the dust collected in the precipitator 15. The sorting means 92 separates the dust supplied from the dust emission line 90 into the ashes to be disposed of and the recycle-limestone to be recycled. The circulation line 94 supplies the recycle-limestone separated by the sorting means 92 to the upstream of the heat-recovery unit 14. Accordingly, the limestone can be recycled. Herein, an example of the sorting means 92 includes a centrifuge such as a cyclone and the like. Furthermore, the sorting means 92 does not necessarily separate components to be disposed of from the limestone to be recycled completely. The recycle-limestone may contain ashes or limestone with lowered desulfurization function due to adherence of the sulfur oxides.

Hereinafter, an example of a control will be descried with reference to FIG. 12. FIG. 12 is a flowchart illustrating an example of treatment of the air pollution control system of another embodiment. The treatment illustrated in FIG. 12 can be carried out when the control device 28 controls the limestone supply operation of the limestone supply device 60 for reducing the $SO_3$ in the flue gas based on the information detected by the $SO_3$ measurement device 62 and the condition stored in advance, more specifically, the condition set in accordance with the relationship illustrated in FIG. 3. The control device 28 repeatedly carries out the treatment illustrated in FIG. 12.

The control device 28a detects $SO_3$ in the upstream of the heat-recovery unit 14 with using the $SO_3$ measurement device (upstream $SO_3$ measurement device) 62 (step S42.) The control device 28a calculates a quantity of the $SO_3$ in the flue gas based on a detected result. The air pollution control system 10a may detect the quantity of the $SO_3$ with using the $SO_3$ measurement device (upstream $SO_3$ measurement device) 62. Alternatively, the air pollution control system 10a may detect the quantity of the $SO_3$ by arithmetizing the result detected by the $SO_3$ measurement device (upstream $SO_3$ measurement device) 62 with using the control device 28a.

The control device 28a calculates a quantity of the limestone ($CaCO_3$) to be flowing through the heat-recovery unit 14, based on the relationship between the quantity of the $SO_3$ detected in the upstream of the heat-recovery unit 14 and the molar ratio of $SO_3$ to $CaCO_3$ (step S44). The control device 28a stores a molar ratio of $SO_3$ to $CaCO_3$ which is determined based on the relationship between the molar ratio of $SO_3$ to $CaCO_3$ and the $SO_3$ reduction rate and a reference $SO_3$ reduction rate. Based on the determined molar ratio of $SO_3$ to $CaCO_3$ and the quantity of the $SO_3$, the control device 28a determines the quantity of the limestone ($CaCO_3$) with the value where the detected quantity of the $SO_3$ and the quantity of the limestone ($CaCO_3$) to be supplied become equivalent to the determined molar ratio of $SO_3$ to $CaCO_3$.

After calculating the quantity of the limestone, the control device 28a calculates the quantity of the limestone to be supplied from the limestone supply device 60 for reducing the $SO_3$ in the flue gas, based on the quantity of the limestone to be flowing through the heat-recovery unit 14 and a quantity of circulating limestone supplied from the circulation line 94 (step S46). The control device 28a then supplies the calculated quantity of the limestone from the limestone supply device 60 for reducing the $SO_3$ in the flue gas (step S48).

A case is considered where the precipitator 15 is disposed in the downstream of the heat-recovery unit 14 as in the air pollution control system 10a and the limestone supply system 50a and where limestone supplied in the upstream of the heat-recovery unit 14 is recovered by the precipitator 15. Even in this case, similar effects to the aforementioned embodiment can be obtained by controlling the quantity of the limestone to be supplied based on the molar ratio of $SO_3$ to $CaCO_3$. Furthermore, as illustrated in FIG. 12, by taking into account the circulating recycle-limestone, it is possible to appropriately set the quantity of the limestone to be supplied. Taking into account a proportion of the limestone contained in the circulating recycle-limestone, the control device 28a preferably determines the quantity of the limestone to be supplied from the limestone supply device 60 for reducing the $SO_3$ in the flue gas. The proportion of the limestone contained in the recycle-limestone may be set in advance or may be measured by providing a measurement device.

Figure 13:
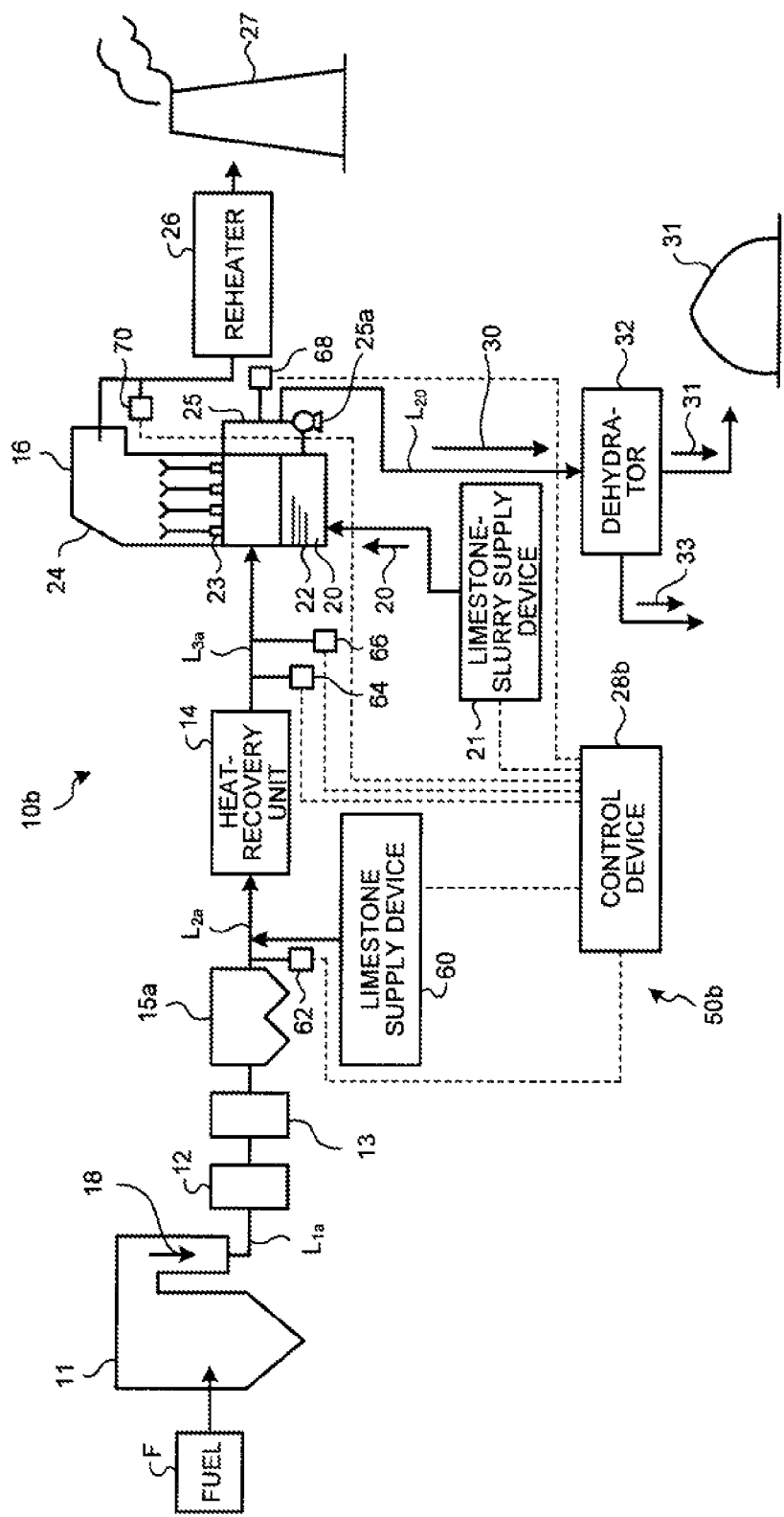
FIG. 13 is a schematic view of a configuration of an air pollution control system according to the other embodiment.

Next, with reference to FIGS. 13 and 14, an air pollution control system according to the other embodiment will be described. FIG. 13 is a schematic view of a configuration of the air pollution control system according to the other embodiment. The air pollution control system 10b illustrated in FIG. 13 has a configuration similar to that of the air pollution control system 10 illustrated in FIG. 1 except for a limestone supply system 50b and a disposition of a precipitator 15a, namely, that the precipitator 15a is disposed in the upstream of the dispositions of the heat-recovery unit 14 and the limestone supply device 60 for reducing the $SO_3$ in the flue gas. Among the elements in the air pollution control, system 10b, explanations for those having similar configurations to those of the air pollution control system 10 will be omitted and points that are particular to the air pollution control system 10b will be hereinafter described.

The air pollution control system 10b illustrated in FIG. 13 includes the boiler 11, the denitrification device 12, the air heater 13, the precipitator 15a, the heat-recovery unit 14, the desulfurization device 16, the reheater 26, the stack 27, a control device 28b, the dehydrator 32, and the limestone supply system 50b. The boiler 11 combusts the fuel F. The denitrification device 12 removes and reduces the nitrogen oxides in the flue gas 18 from the boiler 11. The air heater 13 recovers the heat of the flue gas 18 after denitrification and lowers the temperature of the flue gas 18. The precipitator 15a reduces the dust, as the precipitated ashes, in the flue gas 18 after heat recovery in the air heater 13. The heat-recovery unit 14 lowers the temperature of the flue gas 18 which has passed through the precipitator 15a. The desulfurization device 16 removes and reduces the sulfur oxides contained in the flue gas 18 which has passed through the heat-recovery unit 14 with the limestone-slurry 20, which is the absorbent. The reheater 26 reheats the flue gas desulfurized in the desulfurization device 16. The stack 27 emits the flue gas heated in the reheater 26. The control device 28b controls the operation of each part. The dehydrator 32 recovers the gypsum 31 from the absorbent 30, which is the desulfurized sewage emitted from the desulfurization device 16.

Furthermore, in the air pollution control system 10b, the boiler 11, the denitrification device 12, the air heater 13, and the precipitator 15a are all coupled by the gas supply line $L_{1a}$. The precipitator 15a and the heat-recovery unit 14 are coupled by the gas supply line $L_{2a}$. The heat-recovery unit 14 and the desulfurization device 16 are coupled by the gas supply line $L_{3a}$. Channels such as the gas supply lines $L_{1a}$, $L_{2a}$, $L_{3a}$ and the like where the flue gas flows are the flue gas ducts. The flue gas is emitted from the boiler 11 and passes through the gas supply lines $L_{1a}$, $L_{2a}$, $L_{3a}$ in the order mentioned. The flue gas which has passed through the desulfurization device 16 passes through the reheater 26 and then is emitted from the stack 27. The limestone supply device 60b is coupled to the gas supply line $L_{2a}$ and supplies limestone to the gas supply line $L_{2a}$.

In such manners, in the air pollution control system 10b, the precipitator 15a is disposed in the upstream of the heat-recovery unit 14a and the flue gas before passing through the heat-recovery unit 14a flows in the precipitator 15a. Accordingly, the precipitator 15a collects the dust, as the precipitated ashes, contained in the flue gas to be passing through the heat-recovery unit 14a. In other words, in the air pollution control system 10b, the flue gas which has passed through the heat-recovery unit 14a flows in the desulfurization device 16 without passing through the precipitator 15a.

The limestone supply system 50b of the air pollution control system 10b includes the limestone supply device 60 for reducing the $SO_3$ in the flue gas which supplies the limestone to the flue gas duct in the upstream of the heat-recovery unit 14. The limestone supply system 50b also includes the $SO_3$ measurement device (upstream $SO_3$ measurement device) 62, the $SO_3$ measurement device (downstream $SO_3$ measurement device) 64, a $SO_2$ measurement device (upstream $SO_2$ measurement device) 66, a $CaCO_3$ measurement device 68, a $SO_2$ measurement device (downstream $SO_2$ measurement device) 70. The limestone supply system 50b also includes the limestone-slurry supply device 21 which is a part of the desulfurization device 16, and the control device 28b of the air pollution control system 10b. The limestone supply device 60 for reducing the $SO_3$ in the flue gas, the $SO_3$ measurement device (upstream $SO_3$ measurement device) 62, the $SO_3$ measurement device (downstream $SO_3$ measurement device) 64, and the limestone-slurry supply device 21 are similar to each part of the limestone supply system 50. As mentioned above, the limestone supply device 60 for reducing the $SO_3$ in the flue gas supplies the limestone to the gas supply line $L_{2a}$ between the precipitator 15a and the heat-recovery unit 14. The $SO_3$ measurement device (upstream $SO_3$ measurement device) 62 measures the concentration of the $SO_3$ in the flue gas flowing through the gas supply line $L_{2a}$ between the precipitator 15a and the heat-recovery unit 14. The $SO_3$ measurement device (downstream $SO_3$ measurement device) 64 measures the concentration of the $SO_3$ in the flue gas flowing through the gas supply line $L_{3a}$ between the heat-recovery unit 14 and the desulfurization device 16.

The $SO_2$ measurement device (upstream $SO_2$ measurement device) 66 measures $SO_2$ of the flue gas IS flowing through the gas supply line $L_{3a}$ in a stream upper than the desulfurization device 16. The $SO_2$ measurement device 66 measures $SO_2$ in the flue gas 18 flowing through the gas supply line $L_{3a}$ between the heat-recovery unit 14 and the desulfurization device 16. The $SO_2$ measurement device 66 may measure either concentration of $SO_2$ or $SO_2$ content in the flue gas 18. Furthermore, the $SO_2$ measurement device 66 consecutively measures the concentration of the $SO_2$. Examples of the $SO_2$ measurement device 66 may include a Fourier Transform (FT-IR) type or a laser-type infrared spectrophotometer or a measurement unit using ultraviolet light. Other examples of the $SO_2$ measurement device 66 may include a measurement system other than the infrared spectrophotometer or the measurement unit using ultraviolet light.

The $CaCO_3$ measurement device 68 measures limestone ($CaCO_3$) contained in the absorbent flowing through the absorbent-circulating line 25. An example of the $CaCO_3$ measurement device 68 includes a concentration meter which measures concentration of $CaCO_3$ in liquid. The $CaCO_3$ measurement device 68 consecutively measures the $CaCO_3$. The $CaCO_3$ measurement device 68 may measure $CaCO_3$ content.

The $SO_2$ measurement device (downstream $SO_2$ measurement device) 70 measures the $SO_2$ in the flue gas 18 flowing through the gas supply line in a stream downer than the desulfurization device 16. The $SO_2$ measurement device 70 measures $SO_2$ in the flue gas 18 flowing through the gas supply line between the desulfurization device 16 and the reheater 26. The $SO_2$ measurement device 70 may measure either the concentration of $SO_2$ or the $SO_2$ content, in the flue gas 18. Furthermore, the $SO_2$ measurement device 70 consecutively measures the concentration of the $SO_2$. Examples of the $SO_2$ measurement device 70 may include the Fourier Transform (FT-IR) type or the laser-type infrared spectrophotometer or the measurement, unit using ultraviolet light. Other examples of the $SO_2$ measurement device 70 may include a measurement system other than the infrared spectrophotometer or the measurement unit using ultraviolet light.

The control device 28b controls quantities of limestone to be supplied to the limestone supply device 60 for reducing the $SO_3$ in the flue gas and the limestone-slurry supply device 21, based on the measurement results obtained by the $SO_3$ measurement device (upstream $SO_3$ measurement device) 62, the $SO_3$ measurement device (downstream $SO_3$ measurement device) 64, the $SO_2$ measurement device (upstream $SO_2$ measurement device) 66, the $CaCO_3$ measurement device 68, and the $SO_2$ measurement device (downstream $SO_2$ measurement device) 70. Note that the control device 28b may use the whole measurement results or a part of the measurement results.

Figure 14:
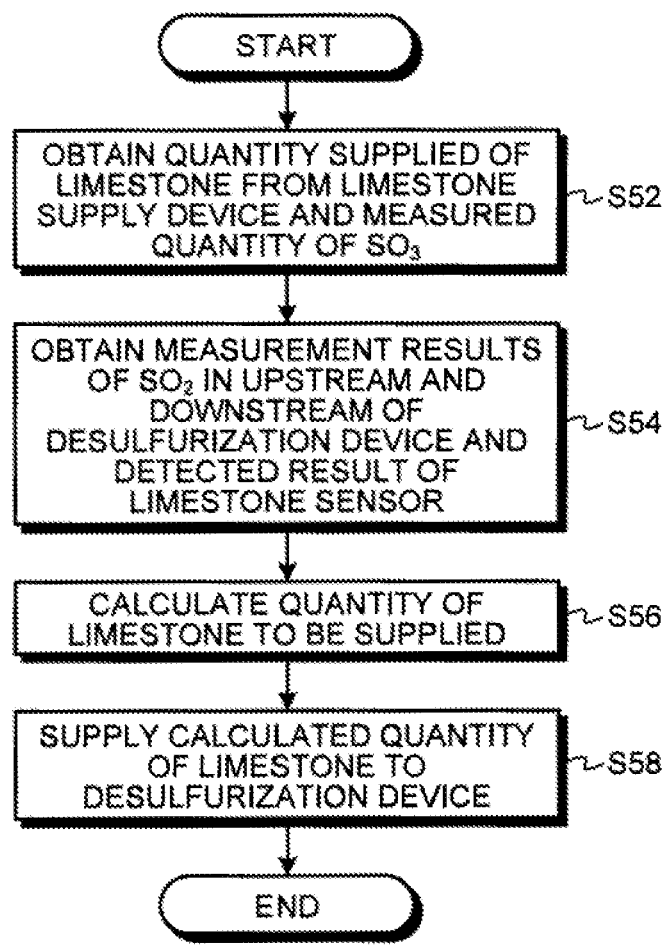
FIG. 14 is a flowchart illustrating an example of treatment of the air pollution control system of the other embodiment.

FIG. 14 is a flowchart illustrating an example of treatment of the air pollution control system of the other embodiment. Herein, the control device 28b carries out the treatment illustrated in FIG. 14 and the treatments illustrated in FIGS. 4 and 5 at the same time. In other words, even in a case where the precipitator 15a is disposed in the upstream of the heat-recovery unit 14, the control device 28b controls the quantity supplied of the limestone to be supplied to the upstream of the heat-recovery unit 14 from the limestone supply device 60 for reducing the $SO_3$ in the flue gas, based on the measurement result obtained by the $SO_3$ measurement device (upstream $SO_3$ measurement device) 62, or the measurement results obtained by both the $SO_3$ measurement device (upstream $SO_3$ measurement device) 62 and the $SO_3$ measurement device (downstream $SO_3$ measurement device) 64.

The control device 28b obtains information of the measured quantity of the $SO_3$ as well as the quantity supplied of the limestone from the limestone supply device 60 for reducing the $SO_3$ in the flue gas (step S52). The control device 28b then obtains the measurement results of $SO_2$ in the upstream and downstream of the desulfurization device 16 with using the $SO_2$ measurement device (upstream $SO_2$ measurement device) 66 and the $SO_2$ measurement, device (downstream $SO_2$ measurement device) 70, so as to obtain a detected result, of a limestone sensor ($CaCO_3$ measurement device 68) (step S54).

The control device 28b calculates the quantity of the limestone to be supplied from the limestone-slurry supply device 21 (step S56). More specifically, based on the information obtained by step S52 and the information obtained by step S54, the quantity of the sulfur oxides and the quantity of the supplied limestone are detected so as to calculate the quantity of the limestone to be supplied to the desulfurization device 16. The control device 28b calculates the quantity of the limestone and then supplies the calculated quantity of the limestone from the limestone-slurry supply device 21 to the desulfurization device 16 (step S58).

The air pollution control system 10b controls the quantity supplied of the limestone to the upstream of the heat-recovery unit 14 based OR the measurement results obtained by the $SO_3$ measurement device (upstream $SO_3$ measurement device) 62 and the $SO_3$ measurement device (downstream $SO_3$ measurement device) 64. In addition, the air pollution control system 10b measures with the $SO_2$ measurement device (upstream $SO_2$ measurement device) 66, the $CaCO_3$ measurement, device 68, and the $SO_2$ measurement device (downstream $SO_2$ measurement device) 70 so as to control the quantity of the limestone to be supplied from the limestone-slurry supply device 21 based on those measurement results. Accordingly, it is possible to control both the quantity of the limestone which has been supplied from the limestone supply device 60 for reducing the $SO_3$ in the flue gas to the flue gas duct, and has passed through the heat-recovery unit 14 and also the quantity of the limestone supplied from the limestone-slurry supply device 21. Accordingly, the air pollution control system 10b can appropriately adjust the quantity of the limestone to be supplied to the desulfurization device 16. Furthermore, the air pollution control system 10b can reduce the quantity of the limestone to be used and enhance the gypsum purity with maintaining high desulfurization performance. For example, the gypsum purity can be set equal to or more than predetermined percentage (for example, 90% or more).

Preferably, the air pollution control system 10b uses all of the SO$_2$ measurement device (upstream SO$_2$ measurement device) 66, the CaCO$_3$ measurement device 68, and the SO$_2$ measurement device (downstream SO$_2$ measurement device) 70. However, the air pollution control system 10b controls the quantity of the limestone to be supplied from the limestone-slurry supply device 21 by utilizing at least one of the SO$_2$ measurement device (upstream SO$_2$ measurement device) 66, the CaCO$_3$ measurement device 68, and the SO$_2$ measurement device (downstream SO$_2$ measurement device) 70. Then it is possible to appropriately adjust the quantity of the limestone to be supplied to the desulfurization device 16. Furthermore, it is possible to reduce the quantity of the limestone to be used and to enhance the purity of the gypsum with maintaining high desulfurization performance.

Note that, in the air pollution control systems 10, 10a, 10b of the present, embodiment, the limestone supply device 60 for reducing the SO$_3$ in the flue gas supplies the limestone to the upstream of the heat-recovery unit 14. However, a disposition where the limestone is supplied by the limestone supply device 60 for reducing the SO$_3$ in the flue gas should not be restricted thereto. The limestone supply device 60 for reducing the SO$_3$ in the flue gas is preferably coupled to the flue gas duct in the stream upper than the desulfurization device 16 and upper than any one of the heat exchangers 14 of the air pollution control systems 10, 10a, 10b with respect to the flow direction of the flue gas 18 and preferably supplies the limestone. The air pollution control systems 10, 10a, 10b of the present embodiment may connect the limestone supply device 60 for reducing the SO$_3$ in the flue gas between the denitrification device 12 of the gas supply line L$_1$ and the air heater 13. Then the air pollution control systems 10, 10a, 10b supply the limestone front the upstream of the air heater 13 with using the limestone supply device 60 for reducing the SO$_3$ in the flue gas. The limestone supply device 60 for reducing the SO$_3$ in the flue gas is coupled to the flue gas duct in the stream upper than the desulfurization device 16 and upper than any one of the heat exchangers of the air pollution control systems 10, 10a, 10b and supplies the limestone thereto. Therefore, the limestone supply device 60 for reducing the SO$_3$ in the flue gas can supply the limestone from the upstream of the heat exchanger, which leads to preferably restraining corrosion in a heating tube of the heat exchanger.

Furthermore, in the air pollution control system 10b, the precipitator 15a is provided to the gas supply line L$_{1a}$ in a stream upper than a connecting portion with the limestone supply device 60 for reducing the SO$_3$ in the flue gas in the gas supply line L$_{2a}$, but it should not be necessarily provided thereto. Furthermore, a case is considered where the limestone supply device 60 for reducing the SO$_3$ in the flue gas supplies limestone between the denitrification device 12 and the air heater 13. In this case, in the air pollution control system 10b, the precipitator 15a is not provided so that the limestone supplied from the limestone supply device 60 for reducing the SO$_3$ in the flue gas is collected by the precipitator 15a. Then the limestone to be supplied to the desulfurization device 16 can be reduced, and the limestone can be supplied to the heat-recovery unit 14, and also the quantity of the limestone to be supplied to the desulfurization device 16 can be preferably adjusted.

REFERENCE SIGNS LIST

10 AIR POLLUTION CONTROL SYSTEM
11 BOILER
12 DENITRIFICATION DEVICE
13 AIR HEATER
14 HEAT-RECOVERY UNIT
15 PRECIPITATOR
16 DESULFURIZATION DEVICE
18 FLOE GAS
20 LIMESTONE-SLURRY
21 LIMESTONE-SLURRY SUPPLY DEVICE (LIMESTONE SUPPLY DEVICE FOR DESULFURIZATION DEVICE)
22 BOTTOM
23 NOZZLE
24 TOP
25 ABSORBENT-CIRCULATING LINE
25a LIQUID-TRANSFER PUMP
26 REHEATER
27 STACK
28 CONTROL DEVICE
30 ABSORBENT
31 GYPSUM
32 DEHYDRATOR
33 DEHYDRATED FILTRATE
50 LIMESTONE SUPPLY SYSTEM
60 LIMESTONE SUPPLY DEVICE FOR REMOVING SO$_3$ IN FLUE GAS (LIMESTONE SUPPLY DEVICE)
62 SO$_3$ MEASUREMENT DEVICE (UPSTREAM SO$_3$ MEASUREMENT DEVICE)
64 SO$_3$ MEASUREMENT DEVICE (DOWNSTREAM SO$_3$ MEASUREMENT DEVICE)
101 TRUCK
102 LIMESTONE STORAGE MEANS
104 LIMESTONE SUPPLY MEANS
106 LIMESTONE TRANSFER MEANS
107 LIMESTONE SUPPLY MEANS
112 SILO
114 BAG FILTER
116 AERATION SYSTEM
116a AIR SUPPLY LINE
116b BLOWER
116c, 148a, 148b FILTER
115 LIMESTONE FEEDER
120a, 120b FEEDER LINE
122a, 122b VALVE
130 SUPPLY LINE
132 SUPPLY OUTLET
140 LIMESTONE SUPPLY LIME
141 NOZZLE
142a, 142b BRANCHING LINE
144a, 144b MIXING UNIT
146a, 14 6b BLOWER
172 LIMESTONE
F FUEL
L$_1$, L$_2$, L$_3$ GAS SUPPLY LINE

The invention claimed is:

1. An air pollution control system, comprising:
a flue gas duct through which flue gas flows;
a heat exchanger disposed in part of the flue gas duct;
a limestone supply device for reducing SO$_3$ in the flue gas provided to an upstream of the heat exchanger which supplies CaCO$_3$ to the flue gas;
an upstream SO$_3$ measurement device provided to a stream upper than a position where the limestone supply device for reducing the SO$_3$ in the flue gas supplies the CaCO$_3$, the upstream SO$_3$ measurement device measures the SO$_3$ in the flue gas, a downstream SO$_3$ measurement device provided to a stream downer than the heat exchanger, the downstream SO$_3$ measurement device measures the SO$_3$ in the flue gas; and a control device which determines a quantity supplied of the CaCO$_3$ based on a relationship between a quantity of the SO$_3$ measured by the upstream SO$_3$ measurement device and a molar ratio of SO$_3$ to CaCO$_3$, which corrects the determined quantity supplied of the CaCO$_3$ based on a quantity of the SO$_3$ measured by the downstream SO$_3$ measurement device and which supplies to the flue gas duct the corrected quantity supplied of the CaCO$_3$ from the limestone supply device for reducing the SO$_3$ in the flue gas, wherein, among the upstream SO$_3$ measurement device and the downstream SO$_3$ measurement device, at least the downstream SO$_3$ measurement device is configured to measure the gaseous SO$_3$ and the mist-like SO$_3$ in the flue gas independently each other.

2. The air pollution control system according to claim 1, wherein the control device sets the molar ratio of CaCO$_3$/SO$_3$ to be 2.0 or more.

3. The air pollution control system according to claim 2, wherein the control device sets a reference value of the molar ratio of CaCO$_3$/SO$_3$ and a SO$_3$ reducing characteristics curve so as to determine, as the quantity supplied of the CaCO$_3$, a quantity within an allowable range set from the reference value and the SO$_3$ reducing characteristics curve.

4. The air pollution control system according to claim 1, further comprising a precipitator which is disposed in the stream lower than the heat exchanger and reducing dust in the flue gas after heat recovery.

5. The air pollution control system according to claim 4, further comprising a circulation system which separates CaCO$_3$ contained in the dust reduced by the precipitator and supplies the separated CaCO$_3$ to the upstream of the heat exchanger, wherein the control device determines the quantity supplied of the CaCO$_3$ as taking into account the CaCO$_3$ circulated in the circulation system.

6. The air pollution control system according to claim 1, further comprising:

a precipitator disposed in the stream upper than the heat exchanger and reducing dust in the flue gas;

a desulfurization device disposed in the stream downer than the heat exchanger and reducing, with an absorbent, sulfur oxides contained in the flue gas from which the dust has been removed and which has passed through the heat exchanger; and a limestone supply device for the desulfurization device supplying CaCO$_3$ to the desulfurization device, wherein the control device determines the quantity of the CaCO$_3$ to be supplied from the limestone supply device for the desulfurization device to the desulfurization device in accordance with a quantity of the CaCO$_3$ to be supplied from the limestone supply device for removing the SO$_3$ in the flue gas, and supplies the determined quantity of the CaCO$_3$ from the limestone supply device for the desulfurization device to the desulfurization device.

7. The air pollution control system according to claim 6, wherein the combustion engine is a boiler, and the heat exchanger is a heat-recovery unit for recovering heat of the flue gas after the dust removal and for raising a temperature of the flue gas emitted from a stack, the air pollution control system further comprising:

a denitrification device which is disposed in the flue gas duct and which reduces nitrogen oxides from the flue gas emitted from the boiler; and an air heater which is disposed in a downstream of the denitrification device of the flue gas duct as well as in an upstream of the precipitator and which recovers the heat of the flue gas which has passed through the denitrification device.

8. The air pollution control system according to claim 6, further comprising a SO$_2$ measurement device which is disposed in at least either an upstream, or a downstream of the desulfurization device and which measures SO$_2$ in the flue gas, wherein the control device determines the quantity of the CaCO$_3$ to be supplied from the limestone supply device for the desulfurization device to the desulfurization device as taking into account a quantity of the SO$_2$ measured by the SO$_2$ measurement device.

9. The air pollution control system according to claim 6, further comprising a CaCO$_3$ measurement device which measures CaCO$_3$ in the absorbent, wherein the control device determines the quantity of the CaCO$_3$ to be supplied from the limestone supply device for the desulfurization device to the desulfurization device as taking into account the quantity of the CaCO$_3$ measured by the CaCO$_3$ measurement device.

10. An air pollution control method by supplying CaCO$_3$ to an upstream of a heat exchanger in an air pollution control system including a flue gas duct through which the flue gas emitted from a combustion engine that combusts fuel flows and including the heat exchanger which is disposed in the flue gas duct, the method comprising:

an upstream measurement step of measuring SO$_3$ in the flue gas flowing in a stream upper than a position where the CaCO$_3$ is supplied;

a downstream measurement step of measuth SO$_3$ of the flue gas flowing in a stream downer than the heat exchanger;

a determination step of determining a quantity supplied of the CaCO$_3$ based on a relationship between the measured quantity of the SO$_3$ in the upstream measurement step and a molar ratio of SO$_3$ to CaCO$_3$;

a correction step of correcting the determined quantity supplied of the CaCO$_3$ based on a quantity of the SO$_3$ measured in the downstream measurement step; and a supply step of suppling the corrected quantity supplied of the CaCO$_3$ to the flue gas duct, wherein, among the upstream measurement step and the downstream measurement step, at least the downstream measurement step measures the gaseous SO$_3$ and the mist-like SO$_3$ in the flue gas independently each other.

* * * * *